US010305085B2

(12) United States Patent
Wakimoto et al.

(10) Patent No.: US 10,305,085 B2
(45) Date of Patent: May 28, 2019

(54) PRISMATIC SECONDARY BATTERY

(71) Applicant: Sanyo Electric Co., Ltd., Daito-shi, Osaka (JP)

(72) Inventors: Ryoichi Wakimoto, Hyogo (JP); Kazuhiro Kitaoka, Hyogo (JP); Yasuhiro Yamauchi, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 171 days.

(21) Appl. No.: 15/278,686

(22) Filed: Sep. 28, 2016

(65) Prior Publication Data

US 2017/0092928 A1    Mar. 30, 2017

(30) Foreign Application Priority Data

Sep. 29, 2015 (JP) ................................. 2015-191447

(51) Int. Cl.
```
H01M 2/34       (2006.01)
H01M 10/04      (2006.01)
H01M 2/02       (2006.01)
H01M 2/06       (2006.01)
H01M 2/04       (2006.01)
H01M 2/22       (2006.01)
H01M 2/26       (2006.01)
H01M 10/052     (2010.01)
```
(52) U.S. Cl.
CPC ......... *H01M 2/345* (2013.01); *H01M 2/0262* (2013.01); *H01M 2/043* (2013.01); *H01M 2/06* (2013.01); *H01M 2/22* (2013.01); *H01M 2/266* (2013.01); *H01M 10/0468* (2013.01); *H01M 10/052* (2013.01); *H01M 2200/20* (2013.01); *H01M 2220/20* (2013.01); *Y02E 60/122* (2013.01)

(58) Field of Classification Search
None
See application file for complete search history.

(56) References Cited

U.S. PATENT DOCUMENTS

| | | |
|---|---|---|
| 2009/0004561 A1 | 1/2009 | Nansaka et al. |
| 2009/0239133 A1 | 9/2009 | Kosugi |
| 2012/0052354 A1 | 3/2012 | Hattori et al. |

(Continued)

FOREIGN PATENT DOCUMENTS

| | | |
|---|---|---|
| JP | 2008-226625 A | 9/2008 |
| JP | 2009-32640 A | 2/2009 |

*Primary Examiner* — Scott J. Chmielecki
(74) *Attorney, Agent, or Firm* — Westerman, Hattori, Daniels & Adrian, LLP

(57) ABSTRACT

An electrode body including a positive electrode plate and a negative electrode plate is accommodated in a prismatic outer package having an opening. The opening of the prismatic outer package is sealed with a sealing plate. The electrode body includes positive electrode tab portions stacked at an end portion on the sealing plate side. The stacked positive electrode tab portions are divided into two forming a first tab group and a second tab group. A resin member serving as a holding member holding a metal member is fixed to the sealing plate. The metal member is disposed between the first tab group and the second tab group. Lead portions of a positive electrode collector is connected to the first tab group and the second tab group at a surface positioned opposite to a surface that opposes the metal member.

16 Claims, 12 Drawing Sheets

(56) References Cited

U.S. PATENT DOCUMENTS

| | | | | |
|---|---|---|---|---|
| 2015/0004448 A1* | 1/2015 | Morita | ............... | H01M 4/628 |
| | | | | 429/61 |
| 2015/0132635 A1 | 5/2015 | Hattori et al. | | |
| 2015/0162590 A1* | 6/2015 | Takahashi | ............... | H01M 2/06 |
| | | | | 429/161 |
| 2015/0194659 A1* | 7/2015 | Kugino | ............... | H01M 2/266 |
| | | | | 429/179 |
| 2015/0207129 A1* | 7/2015 | Tsurumi | ............... | H01M 2/06 |
| | | | | 429/211 |
| 2015/0303443 A1 | 10/2015 | Yokoyama et al. | | |

\* cited by examiner

20

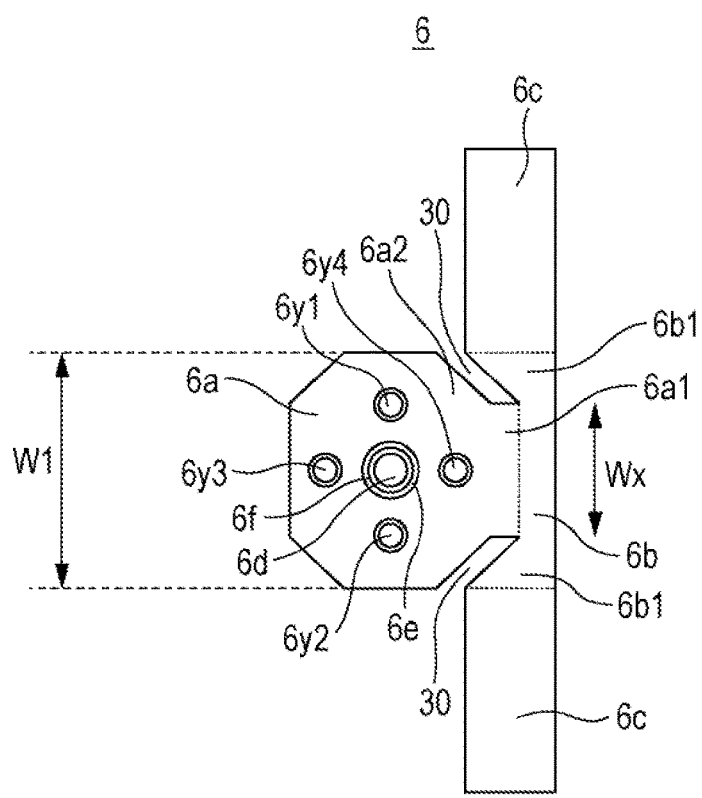

PRISMATIC SECONDARY BATTERY

CROSS REFERENCE TO RELATED APPLICATIONS

The present invention application claims priority to Japanese Patent Application No. 2015-191447 filed in the Japan Patent Office on Sep. 29, 2015, the entire contents of which are incorporated herein by reference.

BACKGROUND OF THE INVENTION

Field of the Invention

The present disclosure relates to a prismatic secondary battery.

Description of Related Art

Secondary batteries such as alkaline secondary batteries and nonaqueous electrolyte secondary batteries are used in power sources for driving electric vehicles (EV), hybrid electric vehicles (HEV, PHEV), and the like. In such applications, since a high capacity or a high input characteristic is required, a battery pack in which a plurality of prismatic secondary batteries are connected in series or in parallel is used.

In such prismatic secondary batteries, a battery case is formed by a bottomed tubular prismatic outer package including an opening and a sealing plate that seals the opening. The battery case accommodates therein an electrode body including positive electrode plates, negative electrode plates, and separators, and an electrolyte. A positive electrode terminal and a negative electrode terminal are installed in the sealing plate. The positive electrode terminal is electrically connected to the positive electrode plates through a positive electrode collector, and the negative electrode terminal is electrically connected to the negative electrode plates through a negative electrode collector.

The positive electrode plate includes a positive electrode core body made of metal and a positive electrode active material layers formed on the surface of the positive electrode core body. A positive electrode core body exposed portion, on which no positive electrode active material layers is formed, is formed in a portion of the positive electrode core body. Furthermore, the positive electrode collector is connected to the positive electrode core body exposed portion. Furthermore, the negative electrode plate includes a negative electrode core body made of metal and a negative electrode active material layer formed on the surface of the negative electrode core body. A negative electrode core body exposed portion, on which no negative electrode active material layer is formed, is formed in a portion of the negative electrode core body. Furthermore, the negative electrode collector is connected to the negative electrode core body exposed portion.

For example, Japanese Published Unexamined Patent Application No. 2009-032640 (Patent Document 1) proposes a prismatic secondary battery using a wounded electrode body including a wounded positive electrode core body exposed portion at one end portion and a wounded negative electrode core body exposed portion at the other end portion. Furthermore, Japanese Published Unexamined Patent Application No. 2008-226625 (Patent Document 2) proposes a prismatic secondary battery that uses an electrode body provided with a positive electrode core body exposed portion and a negative electrode core body exposed portion at one end portion.

BRIEF SUMMARY OF THE INVENTION

Development of on-vehicle secondary batteries, particularly, secondary batteries used in EVs and PHEVs that have a higher energy density and a larger battery capacity are awaited. In the case of the prismatic secondary battery disclosed in Patent Literature 1 described above, spaces such as left and right spaces in which the wound positive electrode core body exposed portion and the wound negative electrode core body exposed portion are disposed and an upper space between the sealing plate and the wound electrode body are required in the battery case. Such a requirement is a factor hindering the increase in energy density of the second battery.

Conversely, as is the case of the prismatic secondary battery disclosed in Patent Literature 2, when the electrode body provided with the positive electrode core body exposed portion and the negative electrode core body exposed portion at one end portion is used, it will be easier to obtain a prismatic secondary battery with a high energy density.

However, development of a secondary battery that not only has a higher energy density, but that is easy to assemble and has a reliable and high current collecting structure is awaited.

An object of the present disclosure is to provide a highly reliable prismatic secondary battery that is high in energy density and capacity.

According to an aspect of the present disclosure, a prismatic secondary battery includes an electrode body that includes a positive electrode plate and a negative electrode plate, an outer package that includes an opening and that houses the electrode body, a sealing plate that seals the opening, a positive electrode terminal electrically connected to the positive electrode plate, and a negative electrode terminal electrically connected to the negative electrode plate. In the prismatic secondary battery, the electrode body includes positive electrode tab portions and negative electrode tab portions that are stacked on a sealing plate side, the stacked positive electrode tab portions or the stacked negative electrode tab portions includes a first tab group and a second tab group, a metal member held with a holding member is disposed between the first tab group and the second tab group, and a collector is connected to at least either one of a surface on a side opposite to a surface on a side facing the metal member in the first tab group or a surface on a side opposite to a surface on a side facing the metal member in the second tab group.

With the above configuration, the prismatic secondary battery not only becomes high in energy density but becomes highly reliable as well.

Desirably, the holding member is fixed to the sealing plate. Note that the sealing plate and the holding member are desirably fixed to each other using a fixation method or an adhesion method. In particular, the sealing plate and the holding member are fixed to each other by, desirably, fitting the fitting portions provided in the sealing plate and the holding member to each other.

Desirably, the sealing plate includes a positive electrode terminal mounting hole in which the positive electrode terminal is disposed, and a negative electrode terminal mounting hole in which the negative electrode terminal is disposed, and a fixed portion of the holding member and the sealing plate is provided between the positive electrode terminal mounting hole and the negative electrode terminal mounting hole.

Desirably, the metal member is a columnar component, the first tab group is disposed on a first end portion of the metal member, and the second tab group is disposed on a second end portion of the metal member.

Desirably, the metal member includes a first metal member and a second metal member, the first tab group is in contact with the first metal member, the second tab group is in contact with the second metal member, and the first metal member and the second metal member are separate components.

Desirably, the secondary prismatic battery further includes a deformation plate electrically connected to the positive electrode terminal or the negative electrode terminal, the deformation plate being disposed on an electrode body side of the sealing plate and becoming deformed when a pressure inside the battery becomes equivalent to or above a predetermined value.

Desirably, the collector includes a plate-shaped collector body portion disposed on the electrode body side of the deformation plate, upon deformation of the deformation plate, a conductive path between the positive electrode plate or the negative electrode plate and the positive electrode terminal or the negative electrode terminal is cut off and a length in a direction perpendicular to the sealing plate from a surface of the sealing plate on an inner side of the battery to an end portion of the holding member on an electrode body side is larger than a length in the direction perpendicular to the sealing plate from the surface of the sealing plate on the inner side of the battery to a surface of the collector body portion on the electrode body side.

Desirably, an end portion of the holding member on an electrode body side is positioned on the electrode body side with respect to a surface of the collector body portion on the electrode body side.

Desirably, a portion that becomes smaller in width in a short direction of the sealing plate from the sealing plate side towards an electrode body side is provided in an end portion of a holding member on the electrode body side.

The present disclosure is capable of providing a highly reliable prismatic secondary battery that is high in energy density and capacity.

BRIEF DESCRIPTION OF THE SEVERAL VIEWS OF THE DRAWINGS

FIG. 11 is a plan view of a positive electrode collector before bending used in the exemplary embodiment.

DETAILED DESCRIPTION OF THE INVENTION

Figure 1:
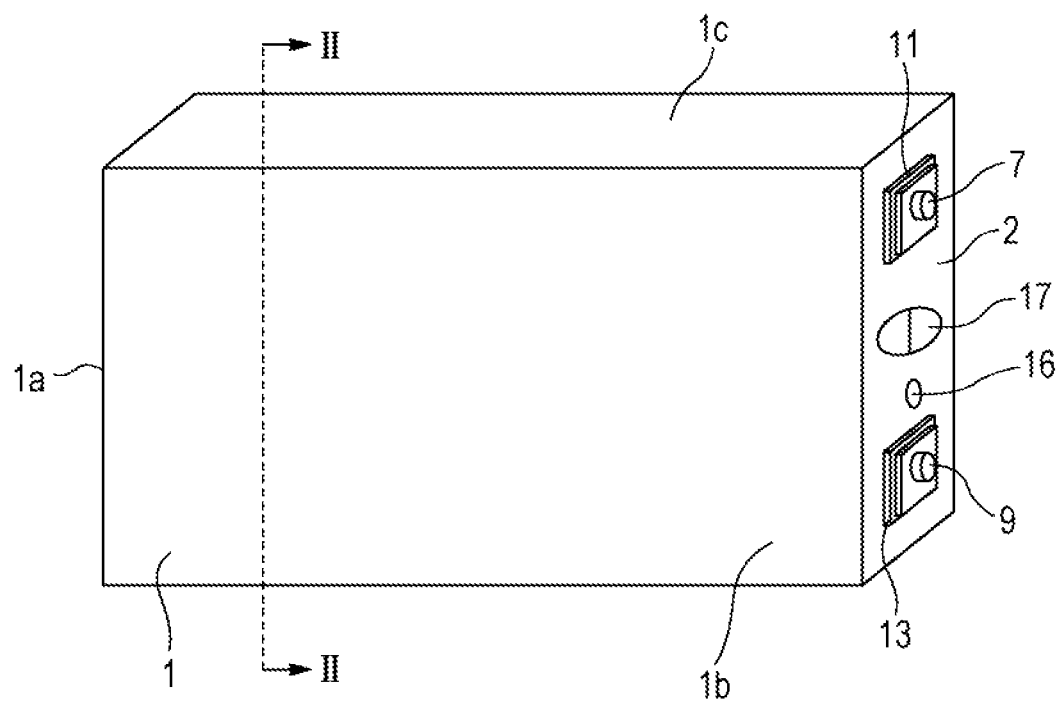
FIG. 1 is a perspective view of a prismatic secondary battery according to an exemplary embodiment.

Hereinafter, a configuration of a prismatic secondary battery 20 according to an exemplary embodiment will be described. Note that the present disclosure is not limited to the following exemplary embodiment.

As illustrated in FIGS. 1 to 6, the prismatic secondary battery 20 includes a prismatic outer package 1 that has an opening, and a sealing plate 2 that seals the opening. The prismatic outer package 1 and the sealing plate 2 are desirably made of metal and, for example, may be made of aluminum or an aluminum alloy. The prismatic outer package 1 includes a bottom 1a, a pair of large-area side walls 1b, and a pair of small-area side walls 1c. The prismatic outer package 1 is a bottomed and tubular outer package having a rectangular shape and includes the opening at a position facing the bottom 1a. A stacked electrode body 3 in which a plurality of positive electrode plates 4 and a plurality of negative electrode plates 5 are stacked with separators interposed therebetween are accommodated in the prismatic outer package 1 together with an electrolyte.

Each positive electrode plate 4 includes a positive electrode core body made of metal and a positive electrode active material layer 4a that include a positive electrode active material formed on the positive electrode core body. Each positive electrode plate 4 includes, at one of its ends, a positive electrode core body exposed portion 4b in which the positive electrode core body is exposed. Note that, desirably, an aluminum foil or an aluminum alloy foil is used for the positive electrode core body. Each negative electrode plate 5 includes a negative electrode core body made of metal and a negative electrode active material layer 5a that include a negative electrode active material formed on the negative electrode core body. Each negative electrode plate 5 includes, at one of its ends, a negative electrode core body exposed portion 5b in which the negative electrode core body is exposed. Note that, desirably, a copper foil or a copper alloy foil is used for the negative electrode core body. In the prismatic secondary battery 20, each positive electrode core body exposed portion 4b constitutes a positive electrode tab portion 4c, and each negative electrode core body exposed portion 5b constitutes a negative electrode tab portion 5c.

At an end portion of the electrode body 3 on the sealing plate 2 side, positive electrode tab portions 4c are disposed in a stacked state and the negative electrode tab portions 5c are disposed in a stacked state. A positive electrode collector 6 is connected to the stacked positive electrode tab portions 4c. Furthermore, a positive electrode terminal 7 is electrically connected to the positive electrode collector 6. A negative electrode collector 8 is connected to the stacked negative electrode tab portions 5c. Furthermore, a negative electrode terminal 9 is electrically connected to the negative electrode collector 8. A pressure-sensitive current breaking mechanism 40 is provided in the conductive path between the positive electrode plates 4 and the positive electrode terminal 7. The current breaking mechanism 40 is activated when the pressure inside the battery becomes equivalent to or higher than a predetermined value, and the current is cut off by cutting off the conductive path between the positive electrode plates 4 and the positive electrode terminal 7. Note that the pressure-sensitive current breaking mechanism 40 may be provided in the conductive path between the negative electrode plates 5 and the negative electrode terminal 9.

Figure 2:
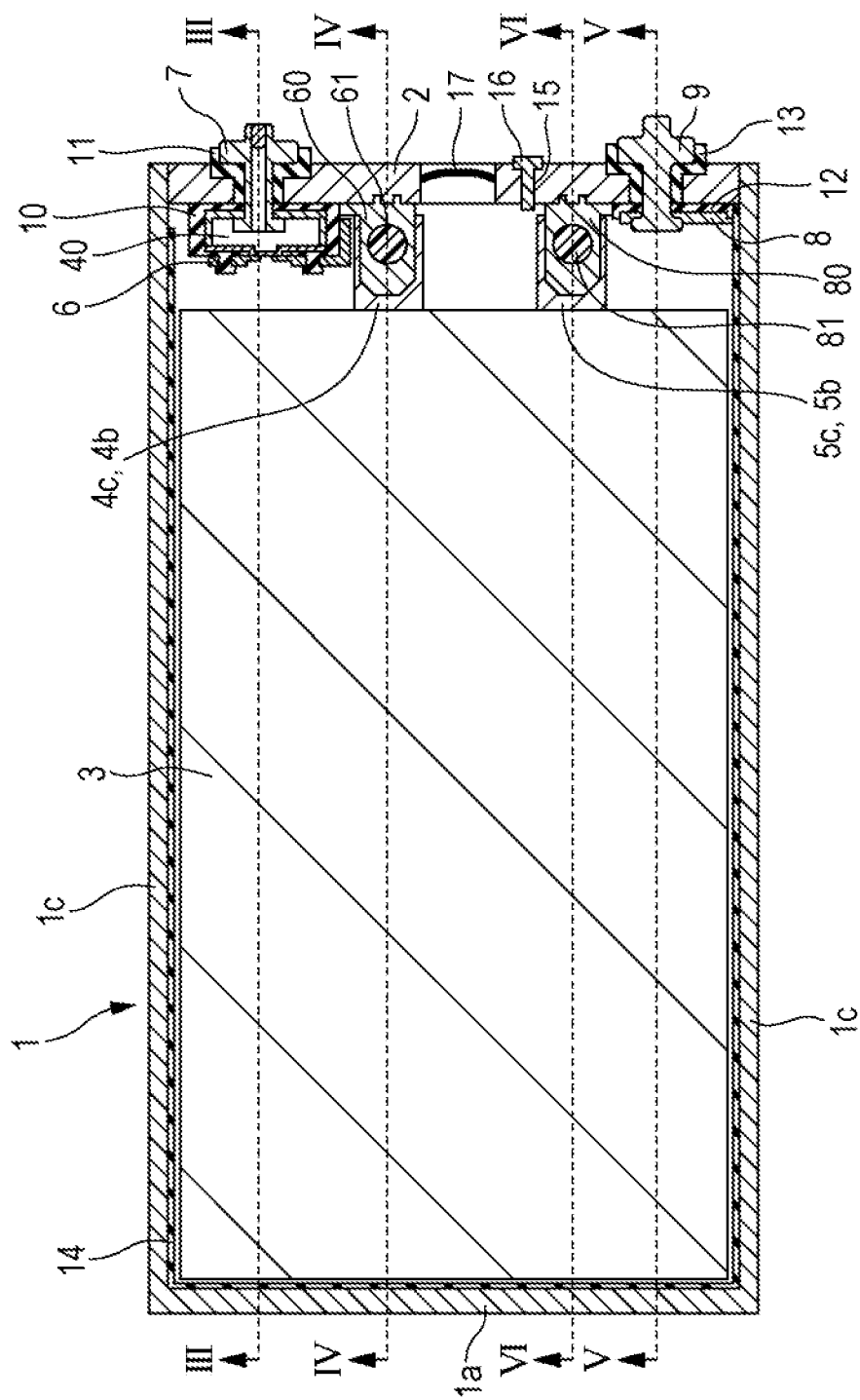
FIG. 2 is a cross-sectional view taken along line II-II in FIG. 1.
Figure 3:
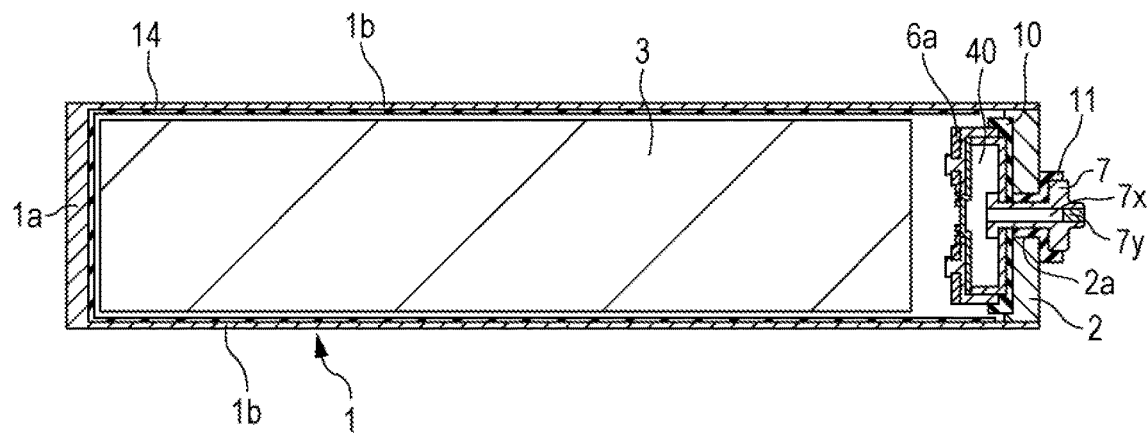
FIG. 3 is a cross-sectional view taken along line III-III in FIG. 2.
Figure 4:
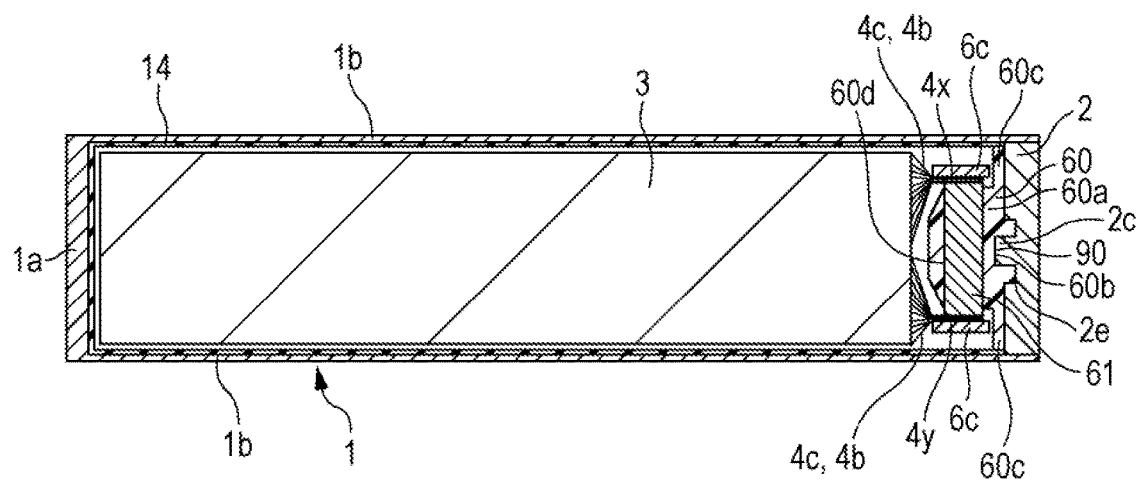
FIG. 4 is a cross-sectional view taken along line IV-IV in FIG. 2.
Figure 5:
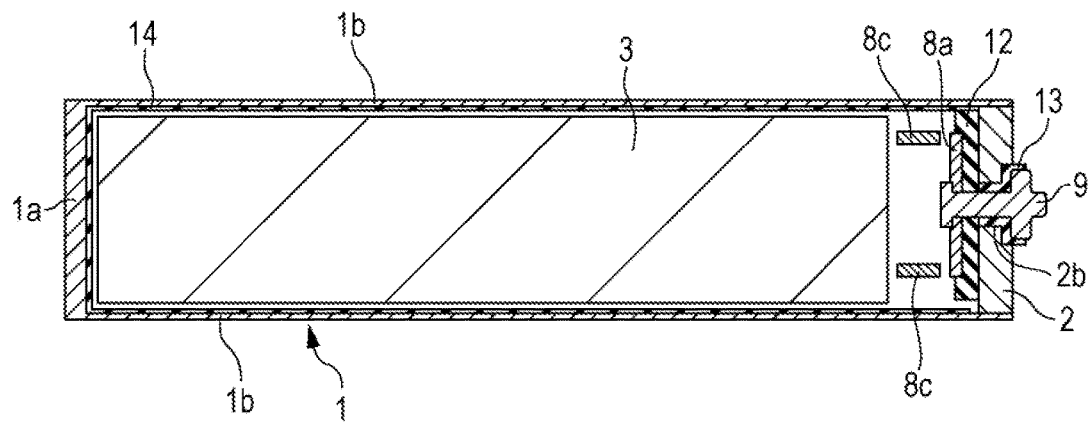
FIG. 5 is a cross-sectional view taken along line V-V in FIG. 2.

As illustrated in FIGS. 2 and 4, a resin member 60 serving as a holding member holding a metal member 61 is connected to a battery inner surface of the sealing plate 2. The resin member 60 and the sealing plate 2 are fitted and connected to each other at a fitting portion 90. The positive electrode tab portions 4c are bundled at two positions and form a first positive electrode tab group 4x and a second positive electrode tab group 4y. The metal member 61 is disposed between the first positive electrode tab group 4x and the second positive electrode tab group 4y. Lead portions 6c are each disposed on an outer surface side of the first positive electrode tab group 4x and the second positive electrode tab group 4y.

Figure 6:
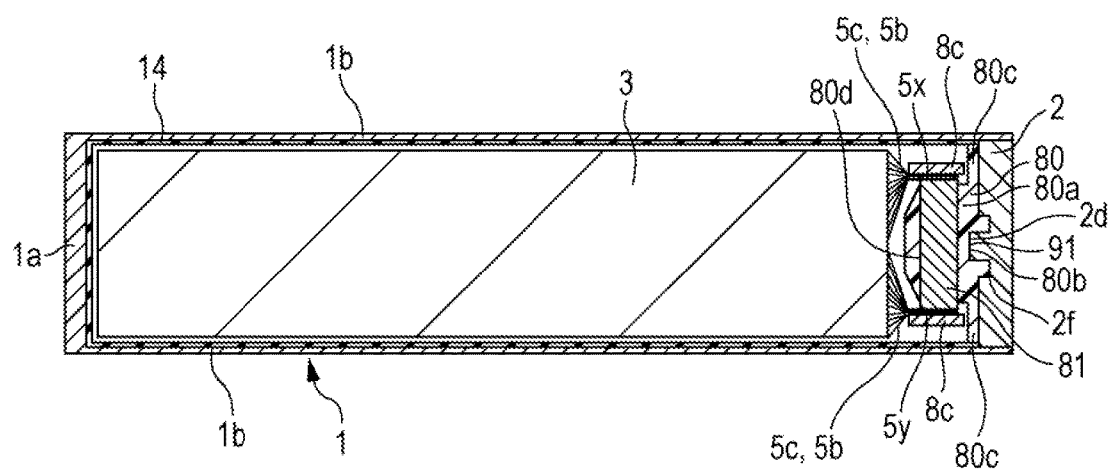
FIG. 6 is a cross-sectional view taken along line VI-VI in FIG. 2.

As illustrated in FIGS. 2 and 6, a resin member 80 holding a metal member 81 is connected to the battery inner surface of the sealing plate 2. The resin member 80 and the sealing plate 2 are fitted and connected to each other at a fitting portion 91. The negative electrode tab portions 5c are bundled at two positions and form a first negative electrode tab group 5x and a second negative electrode tab group 5y. The metal member 81 is disposed between the first negative electrode tab group 5x and the second negative electrode tab group 5y. Lead portions 8c are each disposed on an outer surface side of the first negative electrode tab group 5x and the second negative electrode tab group 5y.

Note that the holding member holding the metal member is desirably a member that has an electrical insulation property. Furthermore, the holding member is, desirably, a resin member or a ceramic member.

The positive electrode terminal 7 is attached to the sealing plate 2 in an electrically insulated state with respect to the sealing plate 2 with an inner side insulating member 10 and an outer side insulating member 11. Furthermore, the negative electrode terminal 9 is attached to the sealing plate 2 in an electrically insulated state with respect to the sealing plate 2 with an inner side insulating member 12 and an outer side insulating member 13. The inner side insulating members 10 and 12 and the outer side insulating members 11 and 13 are desirably made of resin. A terminal through-hole 7x is provided in the positive electrode terminal 7, and the terminal through-hole 7x is sealed with a terminal plug 7y.

The electrode body 3 is accommodated inside the prismatic outer package 1 while being covered by an insulation sheet 14. Desirably, the insulation sheet 14 is a resin sheet folded in a box shape or a bag-shaped resin sheet. The sealing plate 2 is joined to an opening edge portion of the prismatic outer package 1 by, for example, laser welding. The sealing plate 2 includes an electrolyte injection hole 15, and the electrolyte injection hole 15 is sealed with a sealing plug 16 after injection of the electrolyte. A gas discharge valve 17 is formed in the sealing plate 2. The gas discharge valve 17 is activated when the pressure inside the battery becomes equivalent to or higher than a predetermined value and is for discharging gas inside the battery to the outside of the battery. Note that the pressure in which the gas discharge valve 17 is activated is set higher than the pressure in which the current breaking mechanism 40 is activated.

A method for manufacturing the prismatic secondary battery 20 will be described next.

Fabrication of Positive Electrode Plate

A positive electrode slurry containing lithium-nickel-cobalt-manganese composite oxide as a positive electrode active material, polyvinylidene fluoride (PVdF) as a binding agent, a carbon material as a conductive material, and N-methylpyrrolidone (NMP) is fabricated. The positive electrode shiny is coated on both surfaces of a rectangular aluminum foil that is 15 μm thick and that serves as the positive electrode core body. Subsequently, by drying the above, the N-methylpyrrolidone in the positive electrode slurry is removed and the positive electrode active material layers are formed on the positive electrode core body. Subsequently, a compression process is performed to compress the positive electrode active material layers to a predetermined thickness. The positive electrode plate obtained in the above manner is cut into a predetermined shape.

Fabrication of Negative Electrode Plate

A negative electrode slurry containing graphite as a negative electrode active material, styrene-butadiene rubber (SBR) as the binding agent, carboxymethyl cellulose (CMC) as a thickener, and water is fabricated. The negative electrode slurry is coated on both surfaces of a rectangular copper foil that is 8 μm thick and that serves as the negative electrode core body. Subsequently, by drying the above, the water in the negative electrode slurry is removed and the negative electrode active material layers are formed on the negative electrode core body. Subsequently, a compression process is performed to compress the negative electrode active material layers to a predetermined thickness. The negative electrode plate obtained in the above manner is cut into a predetermined shape.

Figure 7A:
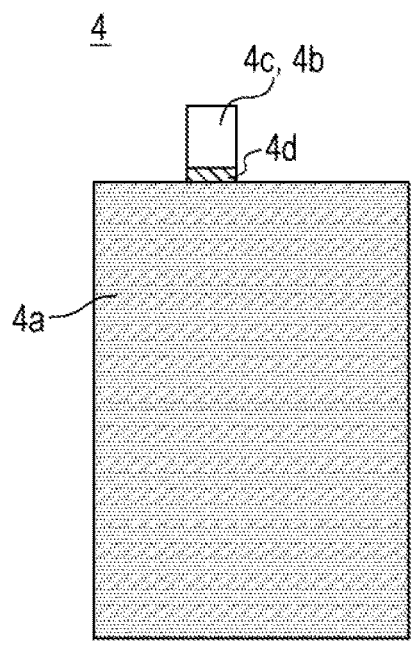
FIGS. 7A and 7B are plan views of a positive electrode plate and a negative electrode plate according to the exemplary embodiment.
Figure 7B:
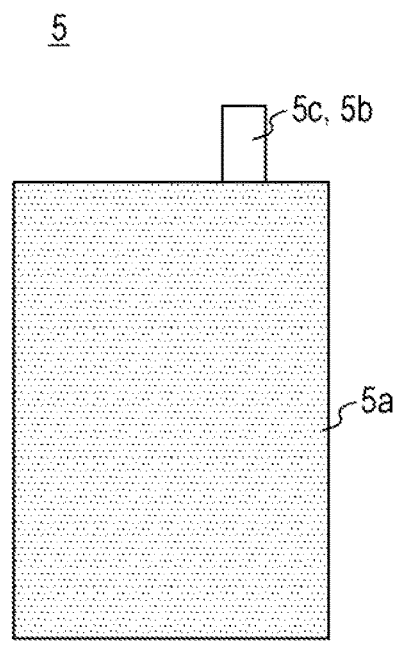

FIG. 7A is a plan view of a positive electrode plate 4 after cutting, and FIG. 7B is a plan view of a negative electrode plate 5 after cutting. The positive electrode plate 4 includes rectangular areas that are positive electrode active material layers 4a formed on both surfaces of the positive electrode core body, and the positive electrode core body exposed portion 4b serving as the positive electrode tab portion 4c is formed on one side of the positive electrode plate 4. The negative electrode plate 5 includes rectangular areas that are negative electrode active material layers 5a formed on both surfaces of the negative electrode core body, and the negative electrode core body exposed portion 5b serving as the negative electrode tab portion 5c is formed on one side of the negative electrode plate 5. Note that the size of the positive electrode plate 4 is slightly smaller than the size of the negative electrode plate 5. Desirably, an insulating layer or a protective layer 4d that has an electric resistance that is higher than that of the positive electrode core body is provided at the base portion of the positive electrode tab portion 4c. Note that conductive members other than the above may be connected to the positive electrode core body exposed portion 4b or the negative electrode core body exposed portion 5b to serve as the positive electrode tab portion 4c or the negative electrode tab portion 5c, respectively.

Fabrication of Stacked Electrode Body

Figure 8:
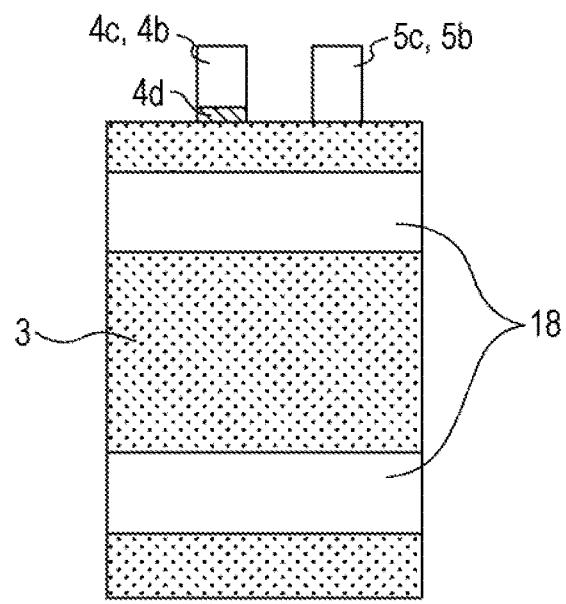
FIG. 8 is a plan view of a multilayered electrode assembly according to the exemplary embodiment.

The stacked electrode body 3 is fabricated by fabricating 100 pieces of positive electrode plates 4 and 101 pieces of negative electrode plates 5 with the above methods and by stacking each positive electrode plate 4 and each negative electrode plate 5 on each other with a rectangular polyolefin separator therebetween. As illustrated in FIG. 8, the stacked electrode body 3 is fabricated such that the positive electrode tab portions 4c of the positive electrode plates 4 and the negative electrode tab portions 5c of the negative electrode plates 5 are stacked at one end portion of the electrode body 3. Desirably, separators are disposed on both outer surfaces of the stacked electrode body 3 and the electrode plates and the separators are fixed with tapes 18 and the like in a stacked state. Alternatively, an adhesion layer may be provided on each separator such that the separators and the positive electrode plates 4, and the separators and the negative electrode plates 5 are adhered to each other. Note that the size of the separator in plan view is the same or larger than the size of the negative electrode plate 5. Each positive electrode plate 4 may be disposed between two separators and after heat welding the outer peripherals of the separators, each of the positive electrode plates 4 and each of the negative electrode plates 5 may be stacked on each other.

Figure 9:
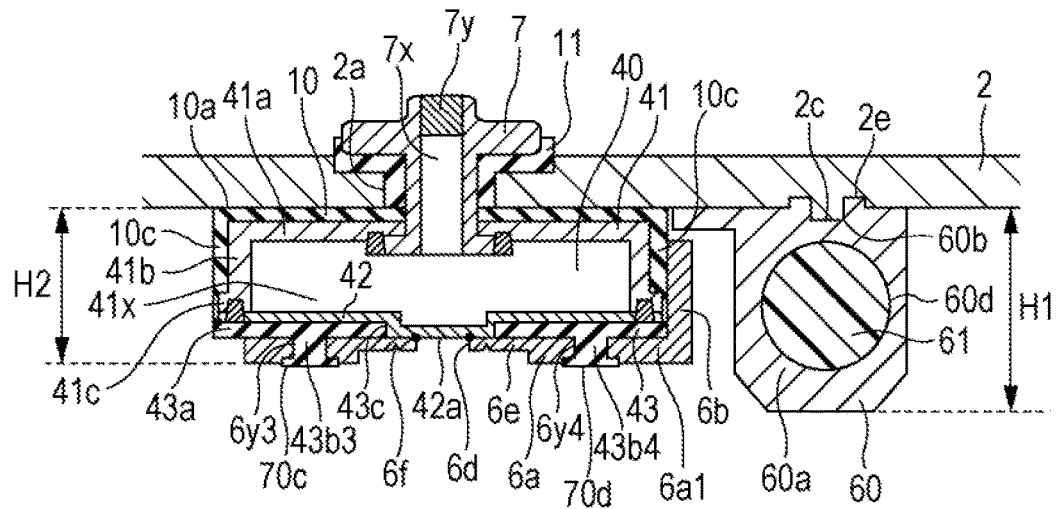
FIG. 9 is a cross-sectional view of a portion in the vicinity of a current breaking mechanism in a longitudinal direction of the sealing plate.
Figure 10:
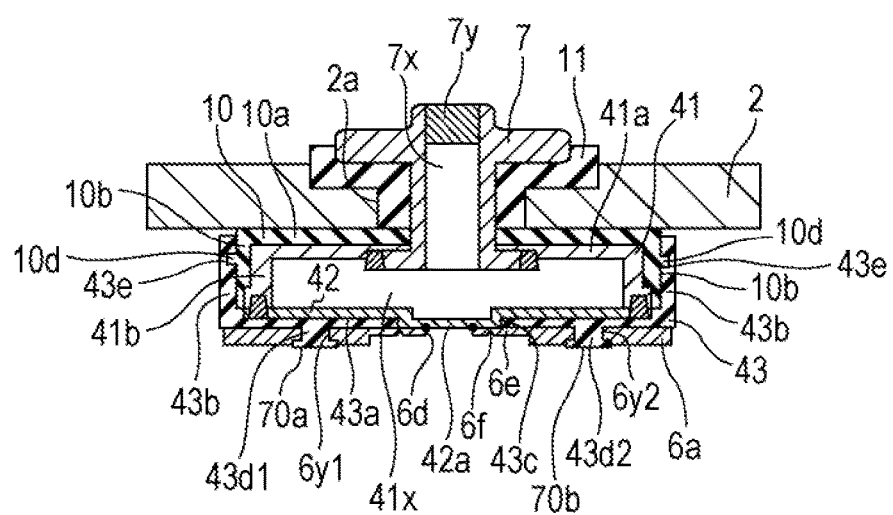
FIG. 10 is a cross-sectional view of a portion in the vicinity of the current breaking mechanism in a short direction of the sealing plate.

Attaching Positive Electrode Terminal and Current Breaking Mechanism to Sealing Plate FIG. 9 is a cross-sectional view of a portion in the vicinity of the current breaking mechanism 40 in the longitudinal direction of the sealing plate 2. FIG. 10 is a cross-sectional view of a portion in the vicinity of the current breaking mechanism 40 in the short direction of the sealing plate 2.

A positive electrode terminal mounting hole 2a serving as a through-hole is formed in the sealing plate 2. The outer side insulating member 11 is disposed on the battery outer surface side of the positive electrode terminal mounting hole 2a, and the inner side insulating member 10 and a conductive member 41 are disposed on the battery inner surface side. Furthermore, the positive electrode terminal 7 is inserted from the outer side of the battery through the through-holes formed in the outer side insulating member 11, the sealing plate 2, the inner side insulating member 10, and the conductive member 41, and the tip of the positive electrode terminal 7 is riveted on the conductive member 41. Note that the riveted portion of the tip of the positive electrode terminal 7 is, desirably, further welded to the conductive member 41.

Desirably, the conductive member 41 has a cup-shape that includes an opening portion 41x open towards the electrode body 3 side. The conductive member 41 includes a base portion 41a that is disposed parallel to the sealing plate 2, and a cylindrical portion 41b that extends from the base portion 41a towards the electrode body 3 side. The cylindrical portion 41b may have a cylindrical shape or may be a rectangular tubular portion. The conductive member 41 is made of metal and, desirably, is made of aluminum or an aluminum alloy. The positive electrode terminal 7 is connected to the base portion 41a. Note that the positive electrode terminal 7 and the conductive member 41 may be an integral component. In such a case, the positive electrode terminal 7 is inserted into the through-holes of the components from the inner side of the battery and is riveted on the outer side of the battery.

The inner side insulating member 10 includes an insulating member body portion 10a disposed between the sealing plate 2 and the base portion 41a of the conductive member 41, a pair of insulating member first side walls 10b that extend from the two end portions of the insulating member body portion 10a in the short direction of the sealing plate 2 towards the electrode body 3 side, and a pair of insulating member second side walls 10c that extend from the two end portions of the insulating member body portion 10a in the longitudinal direction of the sealing plate 2 towards the electrode body 3 side. A protrusion 10d is formed on the outer surface of each insulating member first side wall 10b.

Subsequently, a deformation plate 42 is disposed so as to close the opening portion 41x of the conductive member 41 on the electrode body 3 side, and the outer peripheral edge of the deformation plate 42 is joined to the conductive member 41 by laser welding or the like. With the above, the opening portion 41x of the conductive member 41 on the electrode body 3 side is sealed in an airtight manner. The deformation plate 42 is made of metal and, desirably, is made of aluminum or an aluminum alloy. The shape of the deformation plate 42 is desirably the same as that of the opening portion 41x of the conductive member 41. In the prismatic secondary battery 20, the deformation plate 42 has a circular shape in plan view.

Subsequently, a dielectric plate 43 serving as a first insulating member is disposed on the surface of the deformation plate 42 on the electrode body 3 side. The dielectric plate 43 includes a dielectric plate body portion 43a disposed between the deformation plate 42 and a collector body portion 6a of the positive electrode collector 6, and a pair of dielectric plate first side walls 43b that extend from two edge portions of the dielectric plate body portion 43a in a short direction of the sealing plate 2 towards the sealing plate 2 side. A dielectric plate through-hole 43c, a first projection 43d1, a second projection 43d2, a third projection 43d3, and a fourth projection 43d4 are formed in the dielectric plate body portion 43a. Furthermore, recesses 43e are formed on the inner surface of the dielectric plate first side walls 43b.

A projection 42a formed in the middle portion of the deformation plate 42 is inserted into the dielectric plate through-hole 43c formed in the dielectric plate body portion 43a. Furthermore, the inner surfaces of the dielectric plate first side walls 43b are disposed so as to face the outer surfaces of the insulating member first side walls 10b. Furthermore, by fitting the protrusions 10c and the recesses 43e to each other, the insulating member 10 and the dielectric plate 43 are connected to each other. Note that the recesses 43e may be through-holes.

Flange portions 41c are provided on the end portions of the conductive member 41 on the electrode body 3 side. Furthermore, hooking and fixing portions that can be hooked to the flange portions 41c of the conductive member 41 are desirably provided on the surface of the dielectric plate body portion 43a on the sealing plate 2 side. With the above, the dielectric plate 43 is fixed to the conductive member 41.

Positive Electrode Collector

Figure 12A:
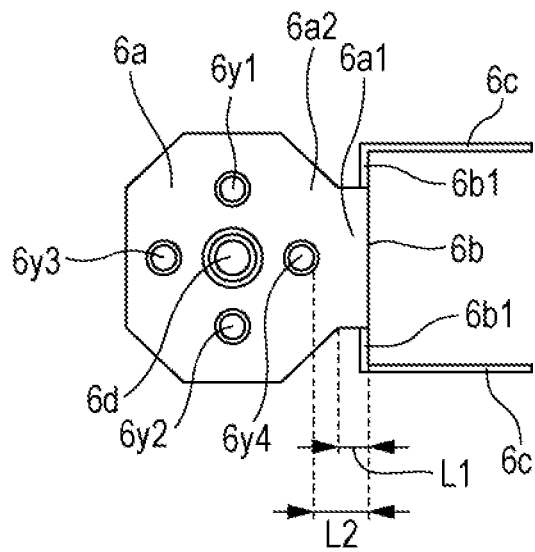
FIGS. 12A to 12C are diagrams illustrating the positive electrode collector after bending used in the exemplary embodiment.
Figure 12B:
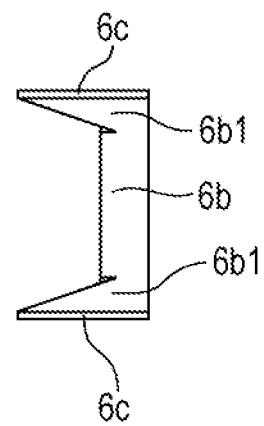
Figure 12C:
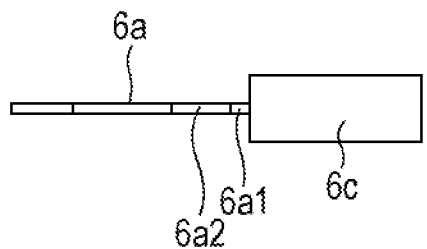

Referring to FIGS. 11 and 12A to 12C, a configuration of the positive electrode collector 6 will be described. FIG. 11 is a plan view of the positive electrode collector 6 before bending, and illustrates a surface thereof on the electrode body 3 side. FIGS. 12A to 12C are diagrams of the positive electrode collector 6 after bending. FIG. 12A is a diagram of the positive electrode collector 6 viewed from the electrode body 3 side, FIG. 12B is a side view of the positive electrode collector 6 viewed from the gas discharge valve 17 side in the longitudinal direction of the sealing plate 2, and FIG. 12C is a side view of the positive electrode collector 6 viewed in the short direction of the sealing plate 2. Note that in FIG. 11, the positive electrode collector 6 is bent at the dotted line portions.

The positive electrode collector 6 includes a collector body portion 6a, a collector connection 6b provided at an end portion of the collector body portion 6a, and the pair of lead portions 6c provided at two edge portions of the collector connection 6b. As illustrated in FIGS. 12A to 12C, the collector connection 6b is provided at the end portion of the collector body portion 6a in the longitudinal direction of the sealing plate 2. Furthermore, the collector connection 6b is provided so as to extend from the collector body portion 6a towards the sealing plate 2. The pair of lead portions 6c are provided at the two edge portions of the collector connection 6b in the short direction of the sealing plate 2. Furthermore, the pair of lead portions 6c are provided so as to extend from the collector connection 6b in the longitudinal direction of the sealing plate 2. Moreover, each of the pair of lead portions 6c is disposed substantially perpendicular to the sealing plate 2. Note that herein, substantially perpendicular refers to a range that is plus 20° to minus 20° with respect to 90°, that is, substantially perpendicular refers to a range of 70° to 110°.

A through-hole 6d for connection is formed in the collector body portion 6a, and a thin wall portion 6e is formed around the through-hole 6d for connection. Furthermore, an annular groove portion 6f is provided inside the thin wall portion 6e so as to surround the through-hole 6d for connection. The thickness (the residual thickness) of the groove portion 6f is smaller than that of the thin wall portion 6e. Note that the annual groove portion 6f is a fragile portion and is broken upon deformation of the deformation plate 42. In other words, the fragile portion is the portion to be broken. Note that since it is only sufficient that the conductive path is cut off upon breakage of the fragile portion, both of the thin wall portion 6e and the groove portion 6f do not have to be provided. Only the thin wall portion 6e or only the groove portion 6f may be provided. Alternatively, the connection between the deformation plate 42 and the collector body portion 6a may be a fragile portion without providing the thin wall portion 6e of the groove portion 6f. Alternatively, the fragile portion, such as the thin wall portion or a groove portion, may be provided in the deformation plate 42.

Note that the through-hole 6d for connection is not an essential configuration, and the thin wall portion provided in the collector body portion 6a may be connected to the deformation plate 42.

A first through-hole 6y1 for fixing, a second through-hole 6y2 for fixing, a third through-hole 6y3 for fixing, and a fourth through-hole 6y4 for fixing are provided in the collector body portion 6a. A recess is provided around each of the first through-hole 6y1 for fixing, the second through-hole 6y2 for fixing, the third through-hole 6y3 for fixing, and the fourth through-hole 6y4 for fixing.

The collector body portion 6a of the positive electrode collector 6 includes a narrow width portion 6a1 at an area adjacent to the collector connection 6b. A width of the narrow width portion 6a1 in the short direction of the sealing plate 2 is smaller than a width W1 of the collector body portion 6a in the short direction of the sealing plate 2 at a portion where the connection with the deformation plate 42 is formed. Note that when the width of the narrow width portion 6a1 in the short direction of the sealing plate 2 is Wx, the value of Wx/W1 is preferably 0.2 to 0.8 and, more preferably is 0.3 to 0.7, and most preferably is 0.3 to 0.6. Furthermore, the length of the area in the longitudinal direction of the sealing plate 2 including the width Wx in which the value of Wx/W1 is 0.2 to 0.8 is preferably 2 mm or more and, more preferably is 3 mm or more. Note that the length of the area in the longitudinal direction of the sealing plate 2 including the width Wx in which the value of Wx/W1 is 0.2 to 0.8 is preferably 20 man or less and, more preferably, is 10 mm or less.

Furthermore, desirably, an area having a substantially uniform (±10% in width, for example) in the short direction of the sealing plate 2 is provided in the narrow width portion 6a1. As illustrated in FIG. 12A, a length L1 of the area having a substantially uniform width is preferably 2 mm or more and, more preferably, is 3 mm or more in the longitudinal direction of the sealing plate 2. Note that the width Wx in the narrow width portion 6a1 does not have to be uniform.

As illustrated in FIG. 12A, a length L2 of the narrow width portion 6a1 in the longitudinal direction of the sealing plate 2 between a fixed portion that is positioned nearest to the collector connection 6b side (the fourth through-hole 6y4 for fixing of a fourth fixed portion 70d) among the fixed portions of the collector body portion 6a of the positive electrode collector 6 and the fixed portions of the dielectric plate 43, and the boundary between the collector body portion 6a and the collector connection 6b is preferably 2 mm or more, and more preferably is 3 mm or more. Furthermore, when the thickness (a thickness in a direction perpendicular to the sealing plate 2) of the narrow width portion 6a1 is T (mm), L2 (mm) is preferably larger than 3T (mm).

The collector body portion 6a of the positive electrode collector 6 includes, in the narrow width portion 6a1, an area 6a2 in which the width thereof in the short direction of the sealing plate 2 becomes gradually smaller. The collector connection 6b of the positive electrode collector 6 includes, at both end sides in the short direction of the sealing plate 2, areas 6b1 in which the lengths thereof become gradually large in the direction perpendicular to the sealing plate 2.

As illustrated in FIG. 12C, in the direction perpendicular to the sealing plate 2, the collector body portion 6a of the positive electrode collector 6 is positioned on the electrode body 3 side with respect to the end portions of the lead portions 6c on the sealing plate 2 side, and is positioned on the sealing plate 2 side with respect to the end portions of the lead portions 6c on the electrode body 3 side.

As illustrated in FIG. 11, in the unfolded positive electrode collector 6, slits 30 are formed between the collector body portion 6a and the collector connection 6b. Furthermore, desirably, the slits 30 are each inclined 20 to 80° with respect to the longitudinal direction of the sealing plate 2. With the above, the collector body portion 6a and the collector connection 6b will not interfere with each other and the internal resistance of the positive electrode collector becomes small.

Attaching Positive Electrode Collector

The positive electrode collector 6 described above is disposed on the surface of the dielectric plate 43 on the electrode body 3 side. In so doing, the first projection 43d1, the second projection 43d2, the third projection 43d3, and the fourth projection 43d4 formed in the dielectric plate 43 are respectively inserted into the first through-hole 6y1 for fixing, the second through-hole 6y2 for fixing, the third through-hole 6y3 for fixing, and the fourth through-hole 6y4 for fixing formed in the positive electrode collector 6. Subsequently, by expanding the diameters of the tips of the first projection 43d1, the second projection 43d2, the third projection 43d3, and the fourth projection 43d4, the positive electrode collector 6 is fixed to the dielectric plate 43. With the above, a first fixed portion 70a, a second fixed portion 70b, a third fixed portion 70c, and a fourth fixed portion 70d are formed. Note that the projections may be press-fitted into the through-holes for fixing.

Gas is sent in through the terminal through-hole 7x formed in the positive electrode terminal 7 from the outer side of the battery, such that the deformation plate 42 is urged against the collector body portion 6a of the positive electrode collector 6. In the above state, the edge portion of the through-hole 6d for connection provided in the collector body portion 6a of the positive electrode collector 6 and the deformation plate 42 are joined together by laser welding or the like. Note that the through-hole 6d for connection is not an essential configuration and a collector body portion 6a that has no through-hole 6d for connection may be joined to the deformation plate 42. The terminal through-hole 7x is sealed with the terminal plug 7y.

The positive electrode collector 6 to which bending has been performed in advance may be connected to the dielectric plate 43 and the deformation plate 42. Alternatively, bending may be performed on the positive electrode collector 6 after the positive electrode collector 6 has been connected to the dielectric plate 43 and the deformation plate 42.

Attaching Negative Electrode Terminal to Sealing Plate

Negative Electrode Collector

Figure 13:
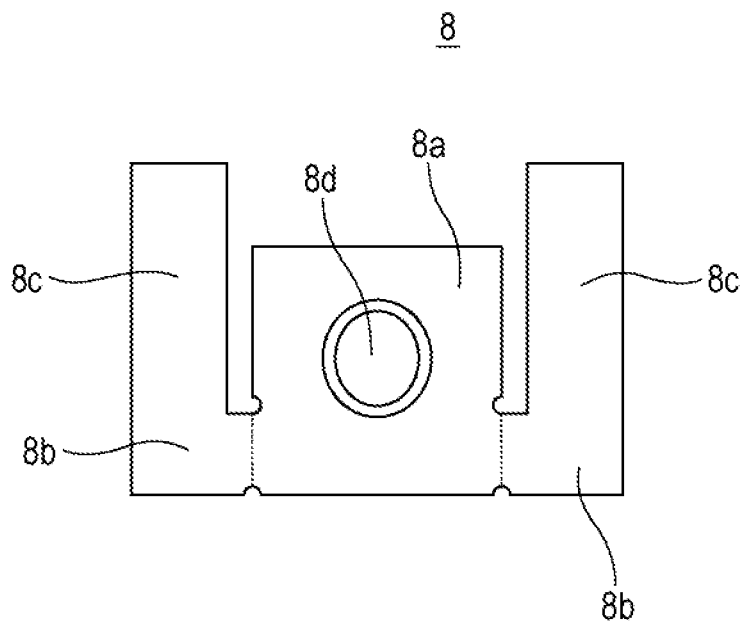
FIG. 13 is a plan view of a negative electrode collector before bending used in the exemplary embodiment.

A configuration of the negative electrode collector 8 will be described. FIG. 13 is a plan view of the negative electrode collector 8 before bending, and illustrates a surface thereof on the electrode body 3 side. The negative electrode collector 8 includes a collector body portion 8a, a pair of collector connections 8b provided at two ends of the collector body portion 8a, and the pair of lead portions 8c provided in the pair of collector connections 8b. In the negative electrode collector 8 to which bending has been performed, the pair of collector connections 8b are disposed at both ends of the collector body portion 8a in the short direction of the sealing plate 2 so as to extend from the collector body portion 8a towards the electrode body 3. The pair of lead portions 8c are disposed so as to extend in the longitudinal direction of the sealing plate 2 from the pair of collector connections 8b. A through-hole 8d into which the negative electrode terminal 9 is inserted is provided in the collector body portion 8a. A recess is formed around the through-hole 8d.

A negative electrode terminal mounting hole 2b serving as a through-hole is formed in the sealing plate 2. The outer side insulating member 13 is disposed on the outer surface side of the negative electrode terminal mounting hole 2b and the inner side insulating member 12 and the collector body portion 8a of the negative electrode collector 8 are disposed on the inner surface side. Furthermore, the negative electrode terminal 9 is inserted from the outer side of the battery through the through-holes formed in the outer side insulating member 13, the sealing plate 2, the inner side insulating member 12, and collector body portion 8a of the negative electrode collector 8, and the tip of the negative electrode terminal 9 is riveted on the negative electrode collector 8. Furthermore, the riveted portion of the negative electrode terminal 9 is welded to the negative electrode collector 8.

Subsequently, bending is performed on the negative electrode collector 8 such that the pair of lead portions 8c and the pair of collector connections 8b are substantially perpendicular to the collector body portion 8a. Note that the negative electrode collector 8 may be connected to the negative electrode terminal 9 after bending has been performed on the negative electrode collector 8.

Attaching Metal Member and Resin Member to Sealing Plate

A first fitting protrusion 2c and a second fitting protrusion 2d are provided in the surface of the sealing plate 2 on the inner side of the battery. A first base end recess 2e is provided around a base end of the first fitting protrusion 2c, and a second base end recess 2f is provided around a base end of the second fitting protrusion 2d. The first fitting protrusion 2c is disposed between the positive electrode terminal mounting hole 2a and the gas discharge valve 17, and the second fitting protrusion 2d is disposed between the negative electrode terminal mounting hole 2b and the gas discharge valve 17.

The resin member 60 includes a holding portion 60a that holds the metal member 61, and a fitting recess 60b into which the first fitting protrusion 2c of the sealing plate 2 is fitted. The holding portion 60a includes a holding through-hole 60d that extends in the short direction of the sealing plate 2. The metal member 61 has a columnar shape and is disposed inside the holding through-hole 60d provided in the holding portion 60a.

The resin member 80 includes a holding portion 80a that holds the metal member 81, and a fitting recess 80b into which the second fitting protrusion 2d of the sealing plate 2 is fitted. The holding portion 80a includes a holding through-hole 80d that extends in the short direction of the sealing plate 2. The metal member 81 has a columnar shape and is disposed inside the holding through-hole 80d provided in the holding portion 80a. Note that the metal members 61 and 81 are desirably, pillar shaped and are, desirably, columnar or prismatic.

The resin member 60 is connected to the sealing plate 2 by fitting the first fitting protrusion 2c of the sealing plate 2 to the fitting recess 60b of the resin member 60 holding the metal member 61. With the above, the fitting portion 90 is formed. Furthermore, the resin member 80 is connected to the sealing plate 2 by fitting the second fitting protrusion 2d of the sealing plate 2 to the fitting recess 80b of the resin member 80 holding the metal member 81. With the above, the fitting portion 91 is formed.

Desirably, the shapes of the first fitting protrusion 2c and the second fitting protrusion 2d in plan view are each elliptical, oval, rectangular, or a rectangle with rounded corners. With the above, rotation of the resin member 60 or the resin member 80 with respect to the sealing plate 2 can be prevented.

As illustrated in FIG. 4, the resin member 60 includes a contact preventing portion 60c disposed between the lead portions 6c of the positive electrode collector 6 and the sealing plate 2. Furthermore, as illustrated in FIG. 6, the resin member 80 includes a contact preventing portion 80c disposed between the lead portions 8c of the negative electrode collector 8 and the sealing plate 2. The contact preventing portion 60c or the contact preventing portion 80c reliably prevents the positive electrode collector 6 or the negative electrode collector 8 from coming in contact with the sealing plate 2.

A thickness of the contact preventing portion 60c is smaller than a thickness of the holding portion 60a in the direction perpendicular to the sealing plate 2. Furthermore, the contact preventing portion 60c is disposed so as to extend towards the large-area side walls 1b of the prismatic outer package 1 from the holding portion 60a.

Figure 14:
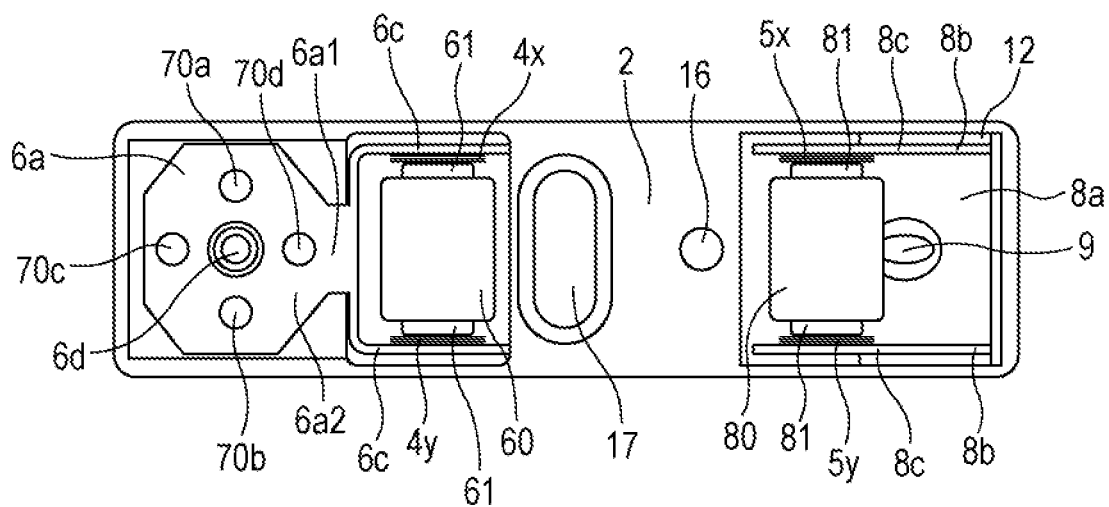
FIG. 14 is a diagram illustrating a surface of a sealing plate on an inner side of the battery in which the positive electrode collector and the negative electrode collector have been installed.
Figure 15:
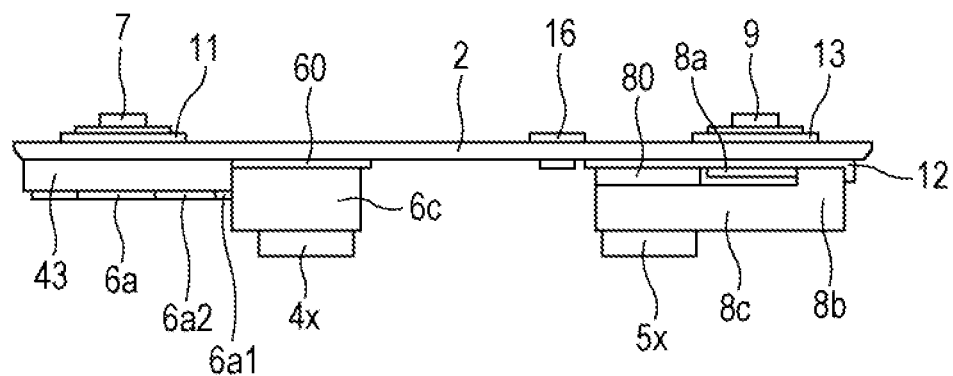
FIG. 15 is a side view of a sealing plate in which the positive electrode collector and the negative electrode collector have been installed.

FIG. 14 is a diagram illustrating the surface of the sealing plate 2 on the inner side of the battery to which the positive electrode collector 6, the negative electrode collector 8, the resin member 60 holding the metal member 61, and the resin member 80 holding the metal member 81 are attached. FIG. 15 is a diagram illustrating a side view of the sealing plate 2 to which the positive electrode collector 6, the negative electrode collector 8, the resin member 60 holding the metal member 61, and the resin member 80 holding the metal member 81 are attached. Similar to the resin member 60, the resin member 80 includes the contact preventing portion 80c and the holding through-hole 80d.

Connecting Positive Electrode Tab Portions and Positive Electrode Collector to Each Other A plurality of positive electrode tab portions 4c are bundled at two positions forming the first positive electrode tab group 4x and the second positive electrode tab group 4y. Note that in the first positive electrode tab group 4x and the second positive electrode tab group 4y, since the positive electrode tab portions 4c are fixed to each other, desirably, the positive electrode tab portions 4c are joined to each other by welding. Alternatively, since the positive electrode tab portions 4c are fixed to each other, desirably, the positive electrode tab portions 4c are fixed to each other with a bundling component. For example, a metal or resin bundling component may fix the bundled positive electrode tab portions 4c while penetrating through the bundled positive electrode tab portions 4c.

The first positive electrode tab group 4x is disposed between first lead portions 6c of the positive electrode collector 6 and the metal member 61. Furthermore, the second positive electrode tab group 4y is disposed between second lead portions 6c of the positive electrode collector 6 and the metal member 61. Subsequently, a pair of resistance welding electrodes are disposed on an outer surface side of the first lead portions 6c and an outer surface side of the second lead portions 6c. Subsequently, resistance welding is performed while the pair of resistance welding electrodes hold the first lead portions 6c, the first positive electrode tab group 4x, the metal member 61, the second positive electrode tab group 4y, and the second lead portions 6c in between. With the above, the first lead portions 6c and the first positive electrode tab group 4x are joined to each other, and the second lead portions 6c and the second positive electrode tab group 4y are joined to each other. In so doing, desirably, the first positive electrode tab group 4x and the second positive electrode tab group 4y are each welded to the metal member 61.

Note that before the first positive electrode tab group 4x and the second positive electrode tab group 4y are disposed between the pair of lead portions 6c of the positive electrode collector 6 and the metal member 61, the positive electrode collector 6 is, desirably, unfolded so that the distal ends of the pair of lead portions 6c are spread outwards.

Connecting Negative Electrode Tab Portions and Negative Electrode Collector to Each Other A plurality of negative electrode tab portions 5c are bundled at two positions forming the first negative electrode tab group 5x and the second negative electrode tab group 5y. Note that similar to the first positive electrode tab group 4x and the second positive electrode tab group 4y, the negative electrode tab portions 5c may be fixed to each other in the first negative electrode tab group 5x and the second negative electrode tab group 5y. The first negative electrode tab group 5x is disposed between first lead portions 8c of the negative electrode collector 8 and the metal member 81. Furthermore, the second negative electrode tab group 5y is disposed between second lead portions 8c of the negative electrode collector 8 and the metal member 81. Subsequently, a pair of resistance welding electrodes are disposed on an outer surface side of the first lead portions 8c and an outer surface side of the second lead portions 8c. Subsequently, resistance welding is performed while the pair of resistance welding electrodes hold the first lead portions 8c, the first negative electrode tab group 5x, the metal member 81, the second negative electrode tab group 8y, and the second lead portions 8c in between. With the above, the first lead portions 8c and the first negative electrode tab group 5x are joined to each other, and the second lead portions 8c and the second negative electrode tab group 5y are joined to each other. In so doing, desirably, the first negative electrode tab group 5x and the second negative electrode tab group 5y are each welded to the metal member 81.

Similar to the positive electrode side, before the first negative electrode tab group 5x and the second negative electrode tab group 5y are disposed between the lead portions 8c of the negative electrode collector 8 and the metal member 81, the negative electrode collector 8 is, desirably, unfolded so that the distal ends of the pair of lead portions 8c are spread outwards.

Assembling Prismatic Secondary Battery

The electrode body 3 that is connected to the sealing plate 2 is covered with the insulation sheet 14 and is inserted into the prismatic outer package 1. Subsequently, the sealing plate 2 and the prismatic outer package 1 is joined together by laser welding or the like and the opening of the prismatic outer package 1 is sealed. After the above, nonaqueous electrolyte containing an electrolyte solvent and electrolyte salt is injected through the electrolyte injection hole 15 provided in the sealing plate 2. Subsequently, the electrolyte injection hole 15 is sealed with the sealing plug 16.

Prismatic Secondary Battery

In the prismatic secondary battery 20, a current collecting structure is formed by disposing the resin member 60 holding the metal member 61 and the resin member 80 holding the metal member 81 between a power storing portion (a portion in which the positive electrode plates 4 and the negative electrode plates 5 are stacked with the separators in between) of the electrode body 3 and the sealing plate 2. Accordingly, the prismatic secondary battery becomes further higher in energy density. Furthermore, since assembling is facilitated and connection of the members can be performed more easily, the prismatic secondary battery becomes one with a high connection quality and high reliability. Note that it is only sufficient that a metal member and a holding member are provided on either one of the positive electrode side or the negative electrode side.

Furthermore, in the prismatic secondary battery 20, the resin member 60 holding the metal member 61 and the resin member 80 holding the metal member 81 are attached to the sealing plate 2. With such a configuration, the positive electrode tab portions 4c or the negative electrode tab portions 5c can be attached in a stable manner to the positive electrode collector 6 or the negative electrode collector 8 after the positive electrode collector 6 or the negative electrode collector 8 has been attached to the sealing plate 2 in advance. Accordingly, the quality of the connection between the positive electrode collector 6 and the electrode tab portions 4c or the quality of the connection between the negative electrode collector 8 and the negative electrode tab portions 8c becomes higher, and the prismatic secondary battery becomes further high in reliability.

The space required for the collector portion can be made smaller without the need for bending the positive electrode collector 6 or the negative electrode collector 8 after the positive electrode tab portions 4c or the negative electrode tab portions 8c have been connected to the positive electrode collector 6 or the negative electrode collector 8 by fixing the resin member 60 holding the metal member 61 or the resin member 80 holding the metal member 81 to the sealing plate 2 and by connecting the positive electrode collector 6 or the negative electrode collector 8 to the positive electrode tab portions 4c or the negative electrode tab portions 5c using the resin member 60 or the resin member 80. Accordingly, load applied to the positive electrode tab portions 4c or the negative electrode tab portions 8c due to bending or the like, and load applied to the joint portions between the positive electrode collector 6 or the negative electrode collector 8 and the positive electrode tab portions 4c or the negative electrode tab portions 8c can be suppressed. Accordingly, a highly reliable prismatic secondary battery having not only a high energy density but one in which damage and the like thereto are suppressed can be obtained.

Furthermore, in a case in which the current breaking mechanism 40 is provided between the positive electrode plates 4 and the positive electrode terminal 7, when the resin member 60 holding the metal member 61 is fixed to the sealing plate 2, even if there is force that moves the electrode body 3 inside the prismatic outer package 1, a load being applied to the connection between the deformation plate 42 and the positive electrode collector 6 and to the fragile portion provided in the positive electrode collector 6 can be suppressed. With the above, the prismatic secondary battery becomes more reliable.

The fixed portion between the resin member 60 and the sealing plate 2 is, desirably, disposed on the gas discharge valve 17 side with respect to the positive electrode terminal mounting hole 2a. Furthermore, the fixing portion between the resin member 60 and the sealing plate 2 is, desirably, disposed on the gas discharge valve 17 side with respect to the end portion of the deformation plate 42 on the gas discharge valve 17 side. Furthermore, the fixed portion between the resin member 80 and the sealing plate 2 is, desirably, disposed on the gas discharge valve 17 side with respect to the negative electrode terminal mounting hole 2b.

As illustrated in FIG. 9, in the direction perpendicular to the sealing plate 2, a length H of the resin member 60 from the surface of the sealing plate 2 on the inner side of the battery to the end portion of the resin member 60 on the electrode body 3 side is, desirably, larger than a length H2 from the surface of the sealing plate 2 on the inner side of the battery to the surface of the collector body portion 6a on the electrode body 3 side. With the above, even if the electrode body 3 moves towards the sealing plate 2, the power storing portion of the electrode body 3 can be suppressed from coming in contact with the collector body portion 6a of the positive electrode collector 6. Accordingly, damage can be suppressed from being caused in the connection between the collector body portion 6a and the deformation plate 42, the fragile portion provided in the collector body portion 6a of the positive electrode collector 6, or the like. Note that in at least one of the resin member 60 and the resin member 80, in the direction perpendicular to the sealing plate 2, the length from the surface of the sealing plate 2 on the inner side of the battery to the end portion on the electrode body 3 side is, desirably, larger than the length from the surface of the sealing plate 2 on the inner side of the battery to the surface of the collector body portion 6a on the electrode body 3 side.

Furthermore, desirably, the end portion of the resin member 60 on the electrode body 3 side is positioned on the electrode body 3 side with respect to the surface of the collector body portion 6a on the electrode body 3 side. With such a configuration, even if the electrode body 3 is moved towards the sealing plate 2 by vibration, an impact, or the like, the electrode body 3 comes in contact with the resin member 60 or the resin member 80 before the collector body portion 6a of the positive electrode collector 6. Accordingly, damage can be suppressed from being caused in the connection between the collector body portion 6a and the deformation plate 42, the fragile portion provided in the collector body portion 6a of the positive electrode collector 6, or the like.

As illustrated in FIGS. 4 and 6, in the short direction of the sealing plate 2, the widths of the end portions of the resin member 60 and the resin member 80 on the electrode body 3 side become smaller from the sealing plate 2 side towards the electrode body 3 side. With the above, the positive electrode tab portions 4c or the negative electrode tab portions 5c can be prevented from becoming damaged by the resin member 60 or the resin member 80.

As illustrated in FIG. 15, in the direction perpendicular to the sealing plate 2, the distance between the sealing plate 2 and the lead portions 8c of the negative electrode collector 8 is larger than the distance between the sealing plate 2 and the lead portions 6c of the positive electrode collector 6. Such a configuration can reliably prevent the negative electrode collector 8 and the sealing plate 2 from coming in contact with each other. With the above, when the sealing plate 2 is made of aluminum or an aluminum alloy, the sealing plate 2 is electrically connected to the negative electrode and formation of a lithium alloy causing corrosion of the sealing plate 2 can be reliably prevented.

As illustrated in FIG. 14, the sealing plug 16 sealing the electrolyte injection hole 15 protrudes on the electrode body 3 side with respect to the surface of the sealing plate 2 on the inner side of the battery. Furthermore, the electrolyte injection hole 15 is formed between the gas discharge valve 17 and the negative electrode terminal mounting hole 2b. In order to obtain a sealing structure with a high durability, the sealing plug 16 is desirably made of metal. For example, the sealing plug 16 may be a blind rivet and may be made of aluminum or an aluminum alloy. In the prismatic secondary battery 20, the negative electrode tab portions 5c are divided into two and are bundled so as to be structured so that the sealing plug 16 and the negative electrode tab portions 5c do not come close to each other; accordingly, electrical connection between the negative electrode tab portion 8c and the sealing plug 16 can be prevented in a further reliable manner. Furthermore, since the prismatic secondary battery 20 is configured so that the resin member 80 is disposed at a portion opposing the sealing plug 16, electrical connection between the negative electrode tab portion 5c and the sealing plug 16 can be prevented in a further reliable manner. Note that in a case in which the sealing plug 16 is made of aluminum or an aluminum alloy, when the sealing plug 16 and the negative electrode tab portion 5c are electrically connected to each other, the sealing plug 16 is turned into a lithium alloy and may disadvantageously become corroded.

As illustrated in FIGS. 11, 12, and 14, the positive electrode collector 6 includes the collector body portion 6a, the collector connection 6b that extends from the end portion of the collector body portion 6a in the longitudinal direction of the sealing plate 2 towards the sealing plate 2, and the pair of lead portions 6c that extend in the longitudinal direction of the sealing plate 2 from the collector connection 6b. With such a configuration, the collector portion can be disposed in the space next to the current breaking mechanism 40 such that the prismatic secondary battery becomes higher in energy density.

Furthermore, the lead portions 6c are disposed substantially perpendicular to the sealing plate 2. With the above, the connecting work of connecting the lead portions 6c and the positive electrode tab portions 4c to each other is facilitated and the quality of the connection can be improved. Accordingly, the prismatic secondary battery becomes more reliable.

The narrow width portion 6a1 is formed in the collector body portion 6a of the positive electrode collector 6 in an area adjacent to the collector connection 6b. With the above, even if there is force course by impact or a vibration of the battery that makes the electrode body 3 pull the lead portions 6c of the positive electrode collector 6, the narrow width portion 6a1 will absorb the stress such that a load to the connection between the collector body portion 6a and the deformation plate 42, or to the fragile portion provided in the collector body portion 6a of the positive electrode collector 6 can be suppressed. Note that in the course of development, the inventors have found that force that moves the lead portions 6c in the direction perpendicular to the sealing plate 2 tends to be generated more easily and, furthermore, that such force has a large adverse effect on the connection between the collector body portion 6a and the deformation plate 42 or the fragile portion provided in the collector body portion 6a of the positive electrode collector 6. Accordingly, it has been found that as is the case of the prismatic secondary battery 20, it is especially effective to provide the narrow width portion 6a1 in the collector body portion 6a. Note that in such a case, the collector body portion 6a is, desirably, substantially parallel to the sealing plate 2. The inclination of the collector body portion 6a with respect to the sealing plate 2 is preferably 0°±20° and, more preferably, is 0°±10 degrees.

Note that in the collector body portion 6a, the narrow width portion 6a1 may be slightly inclined (±30° or smaller, for example) with respect to the other portions of the collector body portion 6a. However, desirably, the narrow width portion 6a1 and the other portions of the collector body portion 6a are flush with each other.

The length of the narrow width portion 6a1 in the longitudinal direction of the sealing plate 2 between the fixed portion positioned nearest to the collector connection 6b side (the fourth through-hole 6y4 for fixing of a fourth fixed portion 70d) among the fixed portions of the collector body portion 6a of the positive electrode collector 6 and the fixed portions of the dielectric plate 43, and the boundary between the collector body portion 6a and the collector connection 6b is preferably 2 mm or more, more preferably is 3 mm or more, and most preferably is 5 mm or more.

When the width of the collector body portion 6a in the short direction of the sealing plate 2 in the portion where the connection with the deformation plate 42 is formed is W1, the width Wx of the narrow width portion 6a1 in the short direction of the sealing plate 2 is set such that Wx/W1 is 0.2 to 0.6. In such a case, desirably, there is a distance of 2 mm or more, more preferably 3 mm or more, and most preferably 5 mm or more in the longitudinal direction of the sealing plate between the fourth through-hole 6y4 for fixing (the fixed portion that is positioned nearest to the collector connection 6b side that is positioned nearest to the collector connection 6b side among the fixed portions of the collector body portion 6a of the positive electrode collector 6 and the fixed portions of the dielectric plate 43) and the boundary between the collector body portion 6a and the collector connection 6b.

The collector connection 6b desirably includes portions in which the lengths thereof in the direction perpendicular to the sealing plate 2 increase from the center towards the outer side in the short direction of the sealing plate 2. With the above, load being applied to the connection between the collector body portion 6a and the deformation plate 42 or to the fragile portion provided in the collector body portion 6a of the positive electrode collector 6 can be suppressed while increase in internal resistance is suppressed.

Furthermore, desirably, the end portion of the lead portions 6c of the positive electrode collector 6 on the electrode body 3 side is positioned on the electrode body 3 side with respect to the end portion of the collector body portion 6a on the electrode body 3 side. With the above, even if the electrode body 3 were to move towards the sealing plate 2, the electrode body 3 can be suppressed from damaging the connection between the collector body portion 6a and the deformation plate 42 or the fragile portion provided in the collector body portion 6a of the positive electrode collector 6.

Description of modifications will be given below. Note that in the modifications, components that are the same as those of the prismatic secondary battery 20 described above are denoted with the same reference numerals as those of the prismatic secondary battery 20. Furthermore, portions that are not described in particular may each have the same configuration as that of the prismatic secondary battery 20 described above.

First Modification

In the prismatic secondary battery 20 described above, an example in which the positive electrode collector 6 and the positive electrode tab portions 4c are connected by resistance welding and in which the negative electrode collector 8 and the negative electrode tab portions 5c are connected by resistance welding has been given. Instead of resistance welding, the method of connecting the collector and the tab portions to each other may be, for example, laser welding in which the connection is performed through projection of a high energy ray. An example of a collector, a metal member, and a resin member that are suitable for welding through projection of a high energy ray is given below.

Figure 16:
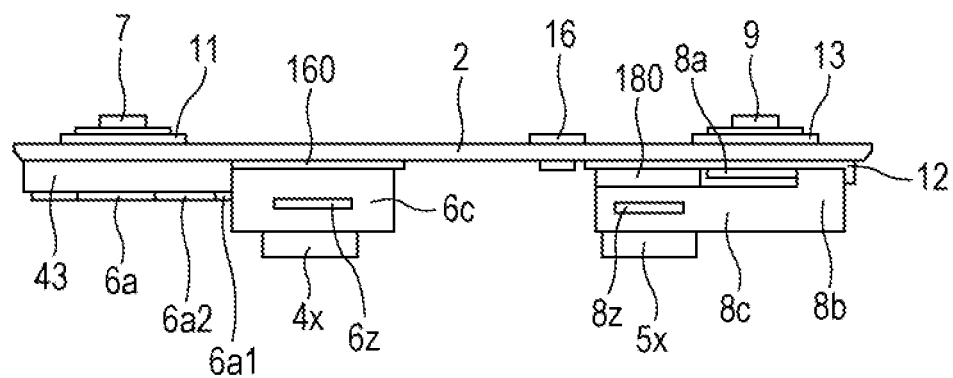
FIG. 16 is a diagram of a prismatic secondary battery according to a first modification, corresponding to FIG. 15.

FIG. 16 is a diagram of a prismatic secondary battery according to a first modification, corresponding to FIG. 15. As illustrated in FIG. 16, a slit 6z is provided in each lead portion 6c of the pair of lead portions 6c of the positive electrode collector 6, and a slit 8z is provided in each lead portion 8c of the pair of lead portions 8c of the negative electrode collector 8. By projecting a high energy ray, such as a laser beam, on the edge portions of the slit 6z and the slit 8z, the lead portions 6c of the positive electrode collector 6 and the positive electrode tab portions 4c are welded to each other and the lead portions 8c of the negative electrode collector 8 and the negative electrode tab portions 5c are welded to each other.

Figure 17:
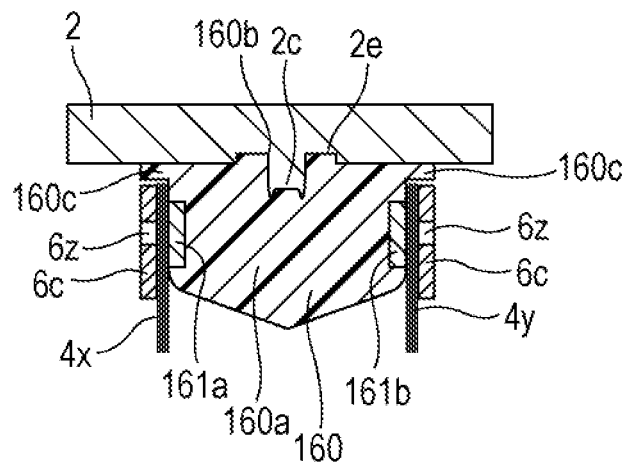
FIG. 17 is a cross-sectional view of the vicinity of the connection between the lead portions of the positive electrode collector and the positive electrode tab portions of the prismatic secondary battery according to the first modification taken in the short direction of the sealing plate.

FIG. 17 is a cross-sectional view of the vicinity of the connection between the lead portions 6c of the positive electrode collector 6 and the positive electrode tab portions 4c of the prismatic secondary battery according to the first modification taken in the short direction of the sealing plate 2. A resin member 160 holds a first metal member 161a and a second metal member 161b in the surface on both sides thereof. The first metal member 161a and the second metal member 161b are each tabular and are disposed so as to be substantially parallel to the large-area side walls of the prismatic outer package 1. The resin member 160 includes a holding portion 160a that holds the first metal member 161a and the second metal member 161b, a fitting recess 160b, and a contact preventing portion 160c. The fitting recess 160b is fixed to the first fitting protrusion 2c of the sealing plate 2. The first positive electrode tab group 4x is welded to the first lead portions 6c while the first positive electrode tab group 4x is held between the first lead portions 6c and the first metal member 161a. Furthermore, the second positive electrode tab group 4y is welded to the second lead portions 6c while the second positive electrode tab group 4y is held between the second lead portions 6c and the second metal member 161b. Note that similar to the positive electrode side, a resin member 180 that holds the first metal member and the second metal member is used in the negative electrode side.

Second Modification

Figure 18:
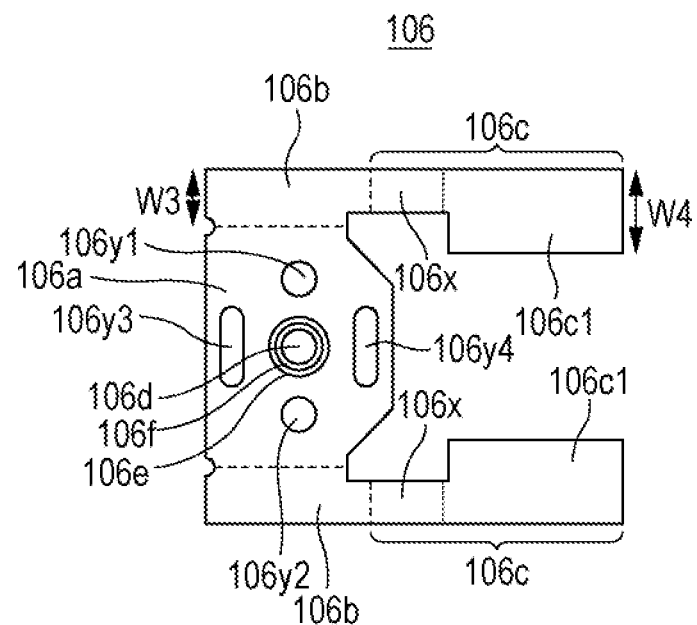
FIG. 18 is a plan view of the positive electrode collector before bending used in the prismatic secondary battery according to a second modification.

FIG. 18 is a plan view of a positive electrode collector 106 before bending used in a prismatic secondary battery according to a second modification, and illustrates a surface thereof on the electrode body 3 side. The positive electrode collector 106 includes a collector body portion 106a, a pair of collector connections 106b provided at the two ends (the two ends in the short direction of the sealing plate 2) of the collector body portion 106a, and a pair of lead portions 106c that are each provided in the corresponding collector connection 106b. In the bent positive electrode collector 106, the collector connections 106b are disposed so as to extend towards the sealing plate 2 from the collector body portion 106a. In other words, the pair of collector connections 106b are bent with respect to the collector body portion 106a towards the far side in FIG. 18. Subsequently, the pair of lead portions 106c are each disposed so as to extend in the longitudinal direction of the sealing plate 2. A wide-width portion 106c1 that has a width (W4) that is wider than a width (W3) of the collector connection 106b is provided at a distal end side of each lead portion 106c.

A through-hole 106d for connection is formed in the collector body portion 106a, and a thin wall portion 106e is formed around the through-hole 106d for connection. Furthermore, an annular groove portion 106f is provided inside the thin wall portion 106e so as to surround the through-hole 106d for connection.

A first through-hole 106y1 for fixing, a second through-hole 106y2 for fixing, a third through-hole 106y3 for fixing, and a fourth through-hole 106y4 for fixing are provided in the collector body portion 106a. The third through-hole 106y3 for fixing and the fourth through-hole 106y4 for fixing each have a track shape. Note that the first projection 43d1, the second projection 43d2, the third projection 43d3, and the fourth projection 43d4 formed in the dielectric plate 43 may have shapes that correspond to the first through-hole 106y1 for fixing, the second through-hole 106y2 for fixing, the third through-hole 106y3 for fixing, and the fourth through-hole 106y4 for fixing, respectively.

Desirably, the third through-hole 106y3 for fixing and the fourth through-hole 106y4 for fixing are provided on a line that passes through the center of the through-hole 106d for connection and that extends in the longitudinal direction of the sealing plate 2, and the third through-hole 106y3 for fixing and the fourth through-hole 106y4 for fixing are provided so as to extend in the short direction of the sealing plate 2. With the above, an increase in internal resistance in the conductive path of the collector body portion 106a of the positive electrode collector 106 can be suppressed, and load being applied to the fragile portion provided in the collector body portion 106a can be reduced.

Figure 19:
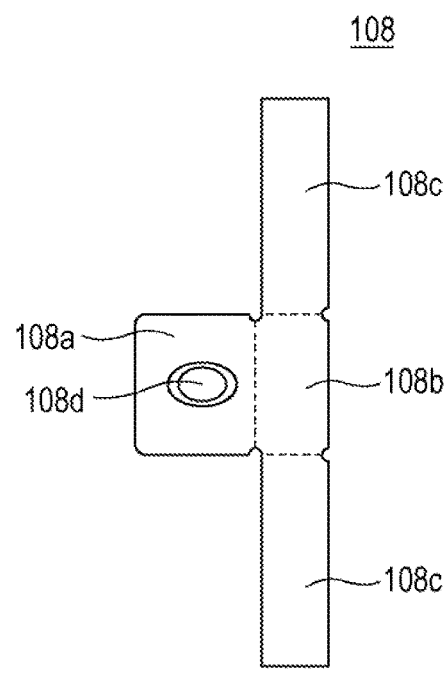
FIG. 19 is a plan view of the negative electrode collector before bending used in the prismatic secondary battery according to the second modification.

FIG. 19 is a plan view of a negative electrode collector 108 before bending used in the prismatic secondary battery according to the second modification, and illustrates the surface thereof on the electrode body 3 side. The negative electrode collector 108 includes a collector body portion 108a, a collector connection 108b provided at the end (the end in the longitudinal direction of the sealing plate 2) of the collector body portion 108a, and a pair of lead portions 108c that extend from the two edge portions of the collector connection 108b in the short direction of the sealing plate 2. The collector connection 108b is bent with respect to the collector body portion 108a so as to extend from the collector body portion 108a towards the electrode body 3. In other words, the collector connection 108b is bent with respect to the collector body portion 108a towards the near side in FIG. 19. Subsequently, the pair of lead portions 108c are bent with respect to the collector connection 108b so as to extend in the longitudinal direction of the sealing plate 2. A through-hole 108d into which the negative electrode terminal 9 is inserted is provided in the collector body portion 108a.

Figure 20:
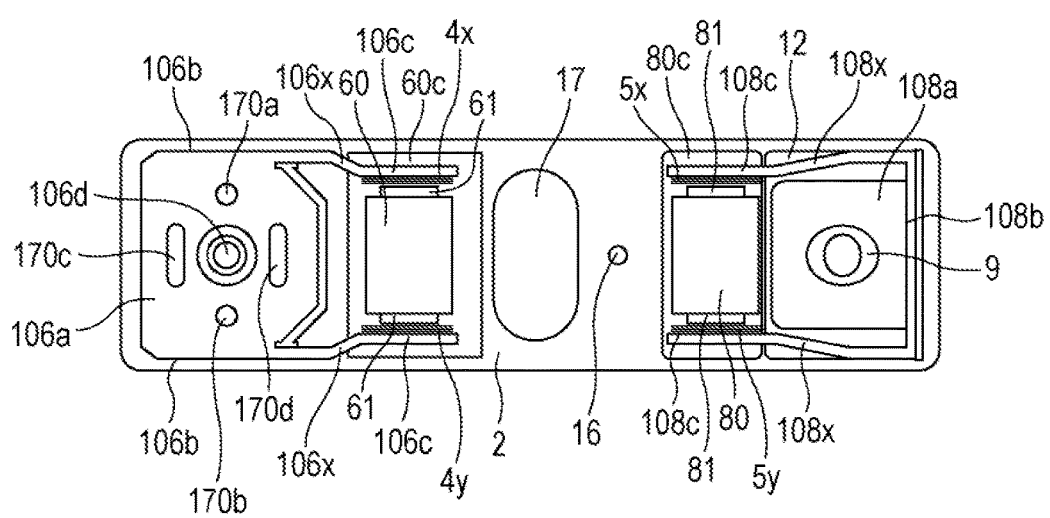
FIG. 20 is a diagram of the prismatic secondary battery according to the second modification, corresponding to FIG. 14.

FIG. 20 is a diagram of the prismatic secondary battery according to the second modification illustrating a surface of the sealing plate 2 on the inner side of the battery to which the positive electrode collector 106 and the negative electrode collector 108 are attached. As illustrated in FIG. 20, first fixed portion 170a to fourth fixed portion 170d are provided in the collector body portion 106a of the positive electrode collector 106. The collector body portion 106a of the positive electrode collector 106 is disposed parallel to the sealing plate 2. The collector connections 106b are disposed so as to extend towards the sealing plate 2 from the end portions of the collector body portion 106a. The lead portions 106c are disposed so as to extend in the longitudinal direction of the sealing plate 2 from the collector connections 106b. Resistance welding is performed while the first positive electrode tab group 4x is interposed between the metal member 61 and a first lead portion 106c, and while the second positive electrode tab group 4y is interposed between the metal member 61 and a second lead portion 106c. Note that in a case of welding using a projection of a high energy ray, desirably, a slit is provided in each lead portion 106c.

The collector body portion 108a of the negative electrode collector 108 is disposed parallel to the sealing plate 2. The collector connection 108b is disposed so as to extend towards the electrode body 3 from the end portion of the collector body portion 108a. The pair of lead portions 108c are disposed so as to extend in the longitudinal direction of the sealing plate 2 from the two ends of the collector connection 108b. Resistance welding is performed while the first negative electrode tab group 5x is interposed between the metal member 81 and a first lead portion 108c, and while the second negative electrode tab group 5y is interposed between the metal member 81 and a second lead portion 108c. Note that when welding using a projection of a high energy ray, desirably, a slit is provided in each lead portion 108c.

Inclined portions 106x are provided in the lead portions 106c of the positive electrode collector 106. The inclined portions 106x are preferably inclined 10 to 80°, and more preferably 30 to 70°, with respect to the portions of the lead portions 106c to which the first positive electrode tab group 4x or the second positive electrode tab group 4y is connected. By providing the inclined portions 106x in the above manner, even if vibration or an impact is applied to the battery, load being applied to the connection between the collector body portion 6a and the deformation plate 42, or the fragile portion provided in the collector body portion 6a of the positive electrode collector 6 can be suppressed. Inclined portions 108x are provided in the lead portions 108c of the negative electrode collector 108. The inclined portions 108x are preferably inclined 10 to 80°, and more preferably 30 to 70°, with respect to the portions of the lead portions 108c to which the first negative electrode tab group 5x or the second negative electrode tab group 5y is connected.

Others

In the prismatic secondary battery 20 described above, the resin member 60 holding the metal member 61, and the resin member 80 holding the metal member 81 are disposed between the positive electrode terminal mounting hole 2a and the negative electrode terminal mounting hole 2b in the longitudinal direction of the sealing plate 2. However, the resin members holding the metal members may be disposed on the external side with respect to the positive electrode terminal mounting hole 2a or the negative electrode terminal mounting hole 2b in the longitudinal direction of the sealing plate 2. In other words, the resin member 60 holding the metal member 61 may be disposed between the end portion, among the two end portions in the longitudinal direction of the sealing plate 2, close to the positive electrode terminal mounting hole 2a and the positive electrode terminal mounting hole 2a in the longitudinal direction of the sealing plate 2. Furthermore, the resin member 80 holding the metal member 81 may be disposed between the end portion, among the two end portions in the longitudinal direction of the sealing plate 2, close to the negative electrode terminal mounting hole 2b and the negative electrode terminal mounting hole 2b in the longitudinal direction of the sealing plate 2.

In the prismatic secondary battery 20 described above, an example using the resin member 60 holding the metal member 61 and the resin member 80 holding the metal member 81 has been given. However, the positive electrode collector 6 and the positive electrode tab portions 4c may be connected to each other without using the resin member 60 holding the metal member 61. Furthermore, the negative electrode collector 8 and the negative electrode tab portion 5c may be connected to each other without using the resin member 80 holding the metal member 81.

In the prismatic secondary battery 20 described above, an example in which the connection between the lead portions 6c of the positive electrode collector 6 and the positive electrode tab portions 4c are disposed on the center side with respect to the positive electrode terminal 7 in the longitudinal direction of the sealing plate 2 has been given. However, the connection between the lead portions 6c of the positive electrode collector 6 and the positive electrode tab portions 4c may be disposed on the external side with respect to the positive electrode terminal 7 in the longitudinal direction of the sealing plate 2. Similarity, the connection between the lead portions 8c of the negative electrode collector 8 and the negative electrode tab portion 5c may be disposed on the external side with respect to the negative electrode collector 8 in the longitudinal direction of the sealing plate 2.

The method of connecting the positive electrode tab portions and the positive electrode collector to each other and the method of connecting the negative electrode tab portions and the negative electrode collector to each other are not limited to any method in particular and, for example, resistance welding, welding through projection of, for example, a high energy ray such as laser ultrasonic welding, or ultrasonic welding may be used.

The form of the electrode body is not limited to any particular form and may be either a wound electrode body, a stacked electrode body, or an electrode body including a plurality of wound electrode bodies.

Desirably, an overcharge inhibitor, which generates gas when the battery becomes overcharged, is included in the battery. In a case of a nonaqueous electrolyte secondary battery, desirably, lithium carbonate is included in the positive electrode active material layers or cyclohexylbenzene or the like is included in the nonaqueous electrolyte. Furthermore, desirably, lithium phosphate is contained in the positive electrode active material layers.

What is claimed is:
1. A prismatic secondary battery comprising:
an electrode body that includes a positive electrode plate and a negative electrode plate;
an outer package that includes an opening and that houses the electrode body;
a sealing plate that seals the opening;
a positive electrode terminal electrically connected to the positive electrode plate; and
a negative electrode terminal electrically connected to the negative electrode plate,
wherein the electrode body includes positive electrode tab portions and negative electrode tab portions that are stacked on a sealing plate side, and
wherein the stacked positive electrode tab portions or the stacked negative electrode tab portions includes a first tab group and a second tab group,
wherein a metal member held with a holding member is disposed between the first tab group and the second tab group, and
wherein a collector is connected to at least either one of a surface on a side opposite to a surface on a side facing the metal member in the first tab group or a surface on a side opposite to a surface on a side facing the metal member in the second tab group, and
the positive electrode plate includes a positive electrode core body, and a positive electrode active material layer disposed on the positive electrode core body;
the negative electrode plate includes a negative electrode core body, and a negative electrode active material layer disposed on the negative electrode core body;
the positive electrode tab portions are included in the positive electrode core body;
the negative electrode tab portions are included in the negative electrode core body;
wherein the holding member is directly fixed to the sealing plate.
2. The prismatic secondary battery according to claim 1, wherein the sealing plate includes a positive electrode terminal mounting hole in which the positive electrode terminal is disposed, and a negative electrode terminal mounting hole in which the negative electrode terminal is disposed, and wherein a fixed portion of the holding member and the sealing plate is provided between the positive electrode terminal mounting hole and the negative electrode terminal mounting hole.

3. The prismatic secondary battery according to claim 1, wherein the metal member is a columnar component, wherein the first tab group is disposed on a first end portion side of the metal member, and wherein the second tab group is disposed on a second end portion side of the metal member.

4. The prismatic secondary battery according to claim 1, wherein the metal member includes a first metal member and a second metal member, wherein the first tab group is in contact with the first metal member, wherein the second tab group is in contact with the second metal member, and wherein the first metal member and the second metal member are separate components.

5. The prismatic secondary battery according to claim 1, wherein the holding member partially protrudes toward the electrode body side beyond a furthest surface of the collector body portion on the electrode body side.

6. The prismatic secondary battery according to claim 1, wherein the holding member includes a tapered end portion facing the electrode body, the tapered end portion gradually narrowing in a direction away from the sealing plate toward the electrode body.

7. A prismatic secondary battery comprising:

an electrode body that includes a positive electrode plate and a negative electrode plate;

an outer package that includes an opening and that houses the electrode body;

a sealing plate that seals the opening;

a positive electrode terminal electrically connected to the positive electrode plate; and a negative electrode terminal electrically connected to the negative electrode plate, wherein the electrode body includes positive electrode tab portions and negative electrode tab portions that are stacked on a sealing plate side, and wherein the stacked positive electrode tab portions or the stacked negative electrode tab portions includes a first tab group and a second tab group, wherein a metal member held with a holding member is disposed between the first tab group and the second tab group, wherein a collector is connected to at least either one of a surface on a side opposite to a surface on a side facing the metal member in the first tab group or a surface on a side opposite to a surface on a side facing the metal member in the second tab group, and wherein the holding member comprises a resin member;

wherein the holding member includes a fitting protrusion, the sealing plate includes a fitting recess, and the fitting protrusion and the fitting recess are fitted together to form a fixed portion.

8. The prismatic secondary battery according to claim 1, wherein the holding member includes a fitting protrusion, the sealing plate includes a fitting recess, and the fitting protrusion and the fitting recess are fitted together to form a fixed portion.

9. The prismatic secondary battery according to claim 8, wherein the sealing plate includes a positive electrode terminal mounting hole in which the positive electrode terminal is disposed, and a negative electrode terminal mounting hole in which the negative electrode terminal is disposed; and the fixed portion is positioned between the positive electrode terminal mounting hole and the negative electrode terminal mounting hole in a longitudinal direction of the sealing plate.

10. The prismatic secondary battery according to claim 1, wherein the holding member includes a fitting recess, the sealing plate includes a fitting protrusion, and the fitting protrusion and the fitting recess are fitted together to form a fixed portion.

11. The prismatic secondary battery according to claim 10, wherein the sealing plate includes a positive electrode terminal mounting hole in which the positive electrode terminal is disposed, and a negative electrode terminal mounting hole in which the negative electrode terminal is disposed, and the fixed portion is positioned between the positive electrode terminal mounting hole and the negative electrode terminal mounting hole in a longitudinal direction of the sealing plate.

12. A prismatic secondary battery comprising:

an electrode body that includes a positive electrode plate and a negative electrode plate;

an outer package that includes an opening and that houses the electrode body;

a sealing plate that seals the opening;

a positive electrode terminal electrically connected to the positive electrode plate; and a negative electrode terminal electrically connected to the negative electrode plate, wherein the electrode body includes positive electrode tab portions and negative electrode tab portions that are stacked on a sealing plate side, and wherein the stacked positive electrode tab portions or the stacked negative electrode tab portions includes a first tab group and a second tab group, wherein a metal member held with a holding member is disposed between the first tab group and the second tab group, and wherein a collector is connected to at least either one of a surface on a side opposite to a surface on a side facing the metal member in the first tab group or a surface on a side opposite to a surface on a side facing the metal member in the second tab group, and the positive electrode plate includes a positive electrode core body, and a positive electrode active material layer disposed on the positive electrode core body;

the negative electrode plate includes a negative electrode core body, and a negative electrode active material layer disposed on the negative electrode core body;

the positive electrode tab portions are included in the positive electrode core body;

the negative electrode tab portions are included in the negative electrode core body;

wherein the collector includes a pair of lead portions, a first lead portion of the pair of lead portions is disposed at a side of the first tab group opposite a side of the first tab group connected to the metal member, and a second lead portion of the pair of lead portions is disposed at a side of the second tab group opposite another side of the second tab group connected to the metal member.

13. The prismatic secondary battery according to claim 1, wherein the collector includes a slit and an edge portion of the slit is connected by welding to the tab group.

14. The prismatic secondary battery according to claim 1, wherein the holding member includes an opening, and the metal member is disposed in the opening of the holding member.

15. The prismatic secondary battery according to claim 1, wherein the collector includes a collector body portion and a lead portion, and the lead portion is disposed substantially perpendicular to the collector body portion.

16. A prismatic secondary battery comprising:

an electrode body that includes a positive electrode plate and a negative electrode plate;

an outer package that includes an opening and that houses the electrode body;

a sealing plate that seals the opening;

a positive electrode terminal electrically connected to the positive electrode plate; and a negative electrode terminal electrically connected to the negative electrode plate, wherein the electrode body includes positive electrode tab portions and negative electrode tab portions that are stacked on a sealing plate side, and wherein the stacked positive electrode tab portions or the stacked negative electrode tab portions includes a first tab group and a second tab group, wherein a metal member held with a holding member is disposed between the first tab group and the second tab group, wherein a collector is connected to at least either one of a surface on a side opposite to a surface on a side facing the metal member in the first tab group or a surface on a side opposite to a surface on a side facing the metal member in the second tab group, and wherein the holding member comprises a resin member;

wherein the holding member includes a fitting recess, the sealing plate includes a fitting protrusion, and the fitting protrusion and the fitting recess are fitted together to form a fixed portion.

* * * * *